US009834245B2

(12) United States Patent
Orihara et al.

(10) Patent No.: US 9,834,245 B2
(45) Date of Patent: Dec. 5, 2017

(54) STEERING DEVICE

(71) Applicant: NSK LTD., Tokyo (JP)

(72) Inventors: Daiki Orihara, Gunma (JP); Hiroshi Kakita, Gunma (JP); Osamu Kurihara, Gunma (JP); Masaya Johta, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/515,724

(22) PCT Filed: Nov. 24, 2015

(86) PCT No.: PCT/JP2015/082959
§ 371 (c)(1),
(2) Date: Mar. 30, 2017

(87) PCT Pub. No.: WO2016/098534
PCT Pub. Date: Jun. 23, 2016

(65) Prior Publication Data
US 2017/0297607 A1    Oct. 19, 2017

(30) Foreign Application Priority Data

Dec. 18, 2014    (JP) .................................. 2014-256605

(51) Int. Cl.
*B62D 1/19*    (2006.01)
*B62D 1/184*    (2006.01)
*B62D 1/185*    (2006.01)

(52) U.S. Cl.
CPC .............. *B62D 1/19* (2013.01); *B62D 1/184* (2013.01); *B62D 1/185* (2013.01); *B62D 1/192* (2013.01)

(58) Field of Classification Search
CPC .......... B62D 1/192; B62D 1/197; B62D 1/19; B62D 1/18
(Continued)

(56) References Cited

U.S. PATENT DOCUMENTS 3,923,319 A    12/1975 Nonaka et al.
2002/0171235 A1    11/2002 Riefe et al.
(Continued)

FOREIGN PATENT DOCUMENTS

JP    49-19234 Y1    5/1974
JP    50-24934 A    3/1975
(Continued)

OTHER PUBLICATIONS

International Search Report of PCT/JP2015/082959, dated Mar. 1, 2016 (PCT/ISA/210).

*Primary Examiner* — Keith J Frisby
(74) *Attorney, Agent, or Firm* — Sughrue Mion, PLLC

(57) ABSTRACT

A steering device includes: an inner column having a first hole opened therein; an outer column having a slit; an outer column bracket clamping the outer column along with a telescopic friction plate; a rod supporting the telescopic friction plate; an inner column bracket supported by the telescopic friction plate and having a second hole opened therein; a shear pin separably connecting the inner column and the inner column bracket to each other at a position across the first hole and the second hole; and a rotation stopper provided at a rear side in relation to the rod and contacting the telescopic friction plate when the telescopic friction plate rotates about the rod in the event of a secondary collision.

8 Claims, 25 Drawing Sheets

(58) Field of Classification Search
USPC .......................................................... 280/777
See application file for complete search history.

(56) References Cited

U.S. PATENT DOCUMENTS

| | | |
|---|---|---|
| 2003/0193180 A1 | 10/2003 | Riefe et al. |
| 2013/0133460 A1 | 5/2013 | Uesaka |
| 2013/0133462 A1* | 5/2013 | Yamamoto ............. B62D 1/184 74/493 |
| 2015/0344062 A1 | 12/2015 | Johta et al. |
| 2015/0353123 A1 | 12/2015 | Jyota et al. |

FOREIGN PATENT DOCUMENTS

| | | |
|---|---|---|
| JP | 2002-160646 A | 6/2002 |
| JP | 2007-069800 A | 3/2007 |
| JP | 2007-168708 A | 7/2007 |
| JP | 2013-112147 A | 6/2013 |
| WO | 2015/064392 A1 | 5/2015 |
| WO | 2015/064395 A1 | 5/2015 |

* cited by examiner

STEERING DEVICE

CROSS REFERENCE TO RELATED APPLICATIONS

This application is a National Stage of International Application No. PCT/JP2015/082959 filed Nov. 24, 2015, claiming priority based on Japanese Patent Application No. 2014-256605, filed Dec. 18, 2014 and Japanese Patent Application No. 2015-009899 filed Jan. 22, 2015, the contents of all of which are incorporated herein by reference in their entirety.

FIELD

The present invention relates to a steering device.

BACKGROUND

A technology using a capsule is widely known as a structure that supports a steering device which gives a rudder angle to a vehicle wheel in accordance with a rotation of a steering wheel. For example, Patent Literature 1 discloses a technology that protects a driver (an operator) from a steering wheel which is pressed upward (as a secondary collision) in such a manner that a part of a capsule is cut so that a steering column moves toward a front side of a vehicle body when an excessive load is applied to the steering column attached to the vehicle body through the capsule so that the steering column is pressed toward the front side of the vehicle body.

CITATION LIST

Patent Literature
Patent Literature 1: JP 2007-69800 A

SUMMARY

Technical Problem

In a case where the steering column is attached to the vehicle body through the capsule as in the technology disclosed in Patent Literature 1, the steering column falls when the capsule is cut. For this reason, in a case where a setting value of a separation load of moving the steering column toward the front side of the vehicle body is decreased in order to further protect an operator having a light weight from a secondary collision, the steering column easily falls due to an erroneous operation. When the steering column falls due to the erroneous operation, it is difficult to further perform a steering operation. For this reason, it was difficult to decrease the setting value of the separation load.

The invention has been made in view of the above-described problems and an object of the invention is to provide a steering device capable of suppressing a steering column from falling due to an erroneous operation even when a setting value of a separation load of moving the steering column toward a front side of a vehicle body is decreased.

Solution to Problem

To achieve the above-described object, a steering device includes a cylindrical inner column which rotatably supports an input shaft connected to a steering wheel and has a first hole opened therein, a cylindrical outer column into which at least a part of the inner column is inserted and which has a slit formed by notching one end from which the inner column is inserted, an outer column bracket which is fixed to a vehicle body side member to support the outer column and clamp the outer column together with a telescopic friction plate which is a plate material, a rod which penetrates the telescopic friction plate and the outer column bracket and supports the telescopic friction plate, an inner column bracket which is supported by the telescopic friction plate and has a second hole formed therein, a shear pin which separably connects the inner column and the inner column bracket at a position across the first hole and the second hole, and a rotation stopper which is provided at a rear side in relation to the rod and contacts the telescopic friction plate when the telescopic friction plate rotates about the rod in the event of a secondary collision.

Accordingly, in the steering device according to the invention, when an excessive load is applied to a steering wheel, the load is transmitted to the inner column through the input shaft so that the inner column moves forward. Meanwhile, the inner column bracket supported by the telescopic friction plate does not move. For this reason, since a shearing force is applied to the shear pin, the shear pin is cut when the load exceeds an allowable shearing force of the shear pin. When the shear pin is cut, a connection between the inner column and the inner column bracket is released. When the connection between the inner column and the inner column bracket is released, the inner column is supported in the axial direction by a friction force generated between the inner column and the outer column. For this reason, the inner column of the steering column moves toward the front side of the vehicle body. Further, the outer column is continuously supported by the outer column bracket fixed to the vehicle body side member even when the shear pin is cut. Further, the inner column is continuously supported by the outer column. For this reason, the steering column does not fall even when the shear pin is cut. Thus, the steering device according to the invention can suppress the steering column from falling due to an erroneous operation even when a setting value of a separation load of moving the steering column toward the front side of the vehicle body decreases.

Further, when the telescopic friction plate rotates in the event of the secondary collision, the rotation stopper contacts the telescopic friction plate. Accordingly, since the rotation of the telescopic friction plate is regulated, the rotation of the inner column bracket connected to the telescopic friction plate is regulated. For this reason, since the inner column bracket hardly contacts the inner column, the forward movement of the inner column is hardly disturbed by the inner column bracket. Thus, the steering device according to the invention can suppress a decrease in impact absorbing capability due to the rotation of the inner column bracket.

As a desirable aspect of the present invention, it is preferable that the rotation stopper is disposed to be separated from the telescopic friction plate with a gap interposed therebetween before the secondary collision occurs.

Accordingly, since the telescopic friction plate and the rotation stopper do not interfere with each other in the normal state, the adjustment of the telescopic position is not disturbed by the rotation stopper. Thus, the steering device can suppress a decrease in impact absorbing capability due to the rotation of the inner column bracket in the event of the secondary collision and can smoothly adjust the telescopic position in the normal state.

As a desirable aspect of the present invention, it is preferable that the telescopic friction plate is disposed at both sides of the outer column, and the rotation stopper contacts each of the telescopic friction plates provided at both sides of the outer column when the telescopic friction plate rotates about the rod.

Accordingly, the rotation of the inner column bracket is regulated from both sides of the outer column. Thus, the rotation of the inner column bracket can be more easily regulated, compared to a case where the rotation regulation portion is provided at only one side of the outer column.

As a desirable aspect of the present invention, it is preferable that the telescopic friction plate includes an uneven surface formed at a position facing the rotation stopper.

Accordingly, the uneven surface is caught by the rotation stopper when the telescopic friction plate rotates. For this reason, the telescopic friction plate hardly slides on the rotation stopper. Thus, the rotation of the telescopic friction plate and the inner column bracket is easily regulated.

As a desirable aspect of the present invention, it is preferable that the rotation stopper is integrated with the outer column.

Accordingly, the steering device can suppress a decrease in impact absorbing capability due to the rotation of the inner column bracket and can suppress an increase in the number of components. Further, since the rotation stopper is integrated with the outer column, the rigidity of the rotation stopper can be improved.

As a desirable aspect of the present invention, it is preferable that the telescopic friction plate is disposed between the outer column bracket and the outer column, and the rotation stopper includes a protrusion portion which overlaps the outer column bracket when viewed from an axial direction of the outer column.

Accordingly, an area facing the telescopic friction plate in the rotation stopper becomes larger outward in the radial direction of the outer column (toward the outer column bracket). For this reason, the telescopic friction plate easily contacts the rotation stopper when the telescopic friction plate rotates. Thus, the rotation of the inner column bracket is easily suppressed.

As a desirable aspect of the present invention, it is preferable that the telescopic friction plate is disposed on an outer surface of the outer column bracket.

A space at the outside of the outer column bracket is wider than a space at the inside of the outer column bracket. For this reason, the number of the telescopic friction plates can be easily increased even when there is a need to obtain a further strong clamping and holding force for the steering column.

As a desirable aspect of the present invention, it is preferable that the rotation stopper is an annular member that is positioned at the rear side of the slit and surrounds an entire periphery of the inner column.

Accordingly, a deformation of the outer column due to the clamping hardly concentrates on the rear end of the slit. That is, a deformation of the outer column due to the clamping becomes easily equal at the front and rear sides of the rod. For this reason, the friction forces of the inner column and the outer column can be easily set during the clamping operation.

Advantageous Effects of Invention

According to the invention, it is possible to provide a steering device capable of suppressing a steering column from falling due to an erroneous operation even when a setting value of a separation load of moving the steering column toward a front side of a vehicle body is decreased.

DESCRIPTION OF EMBODIMENTS

A mode for carrying out the invention (an embodiment) will be described in detail with reference to the drawings. The invention is not limited by the contents described in the following embodiment. In addition, components described below include a component which is easily assumed by those skilled in the art and a component which has substantially the same configuration. Further, the components to be described below can be appropriately combined with one another.

Embodiment

Figure 1:
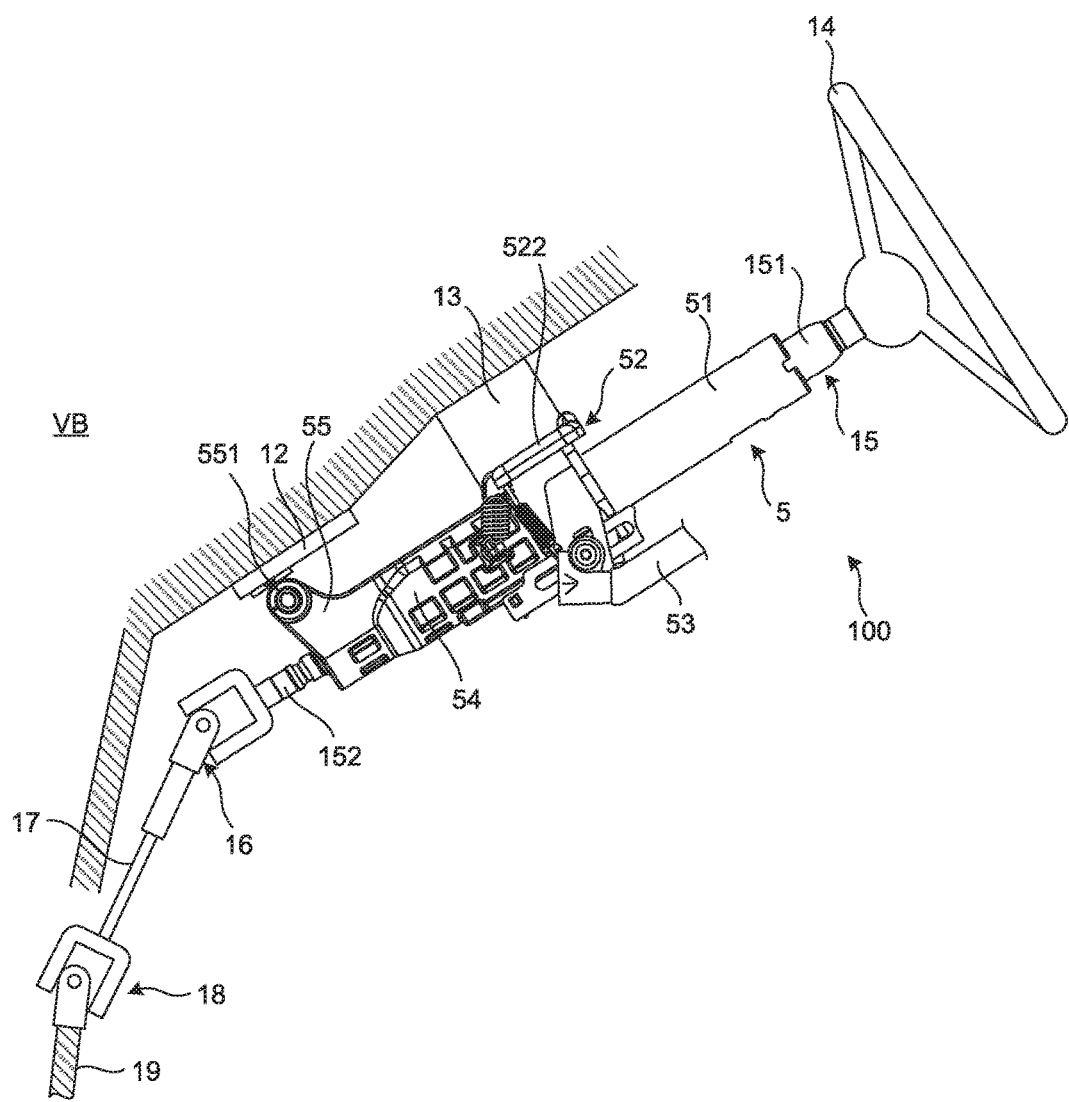
FIG. 1 is a diagram schematically illustrating the periphery of a steering device according to an embodiment.
Figure 2:
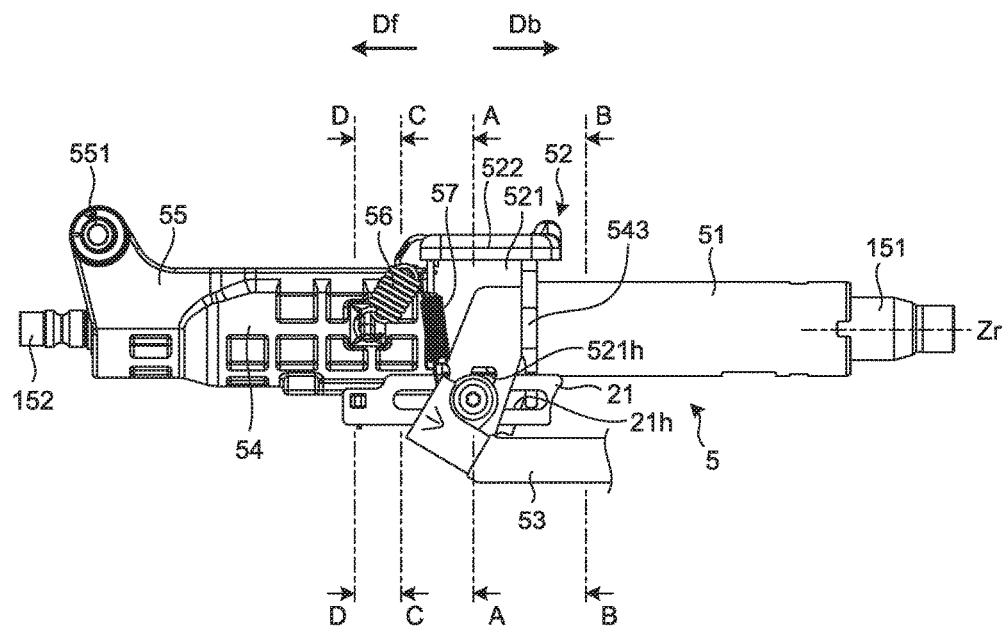
FIG. 2 is a side view of the steering device according to the embodiment.
Figure 3:
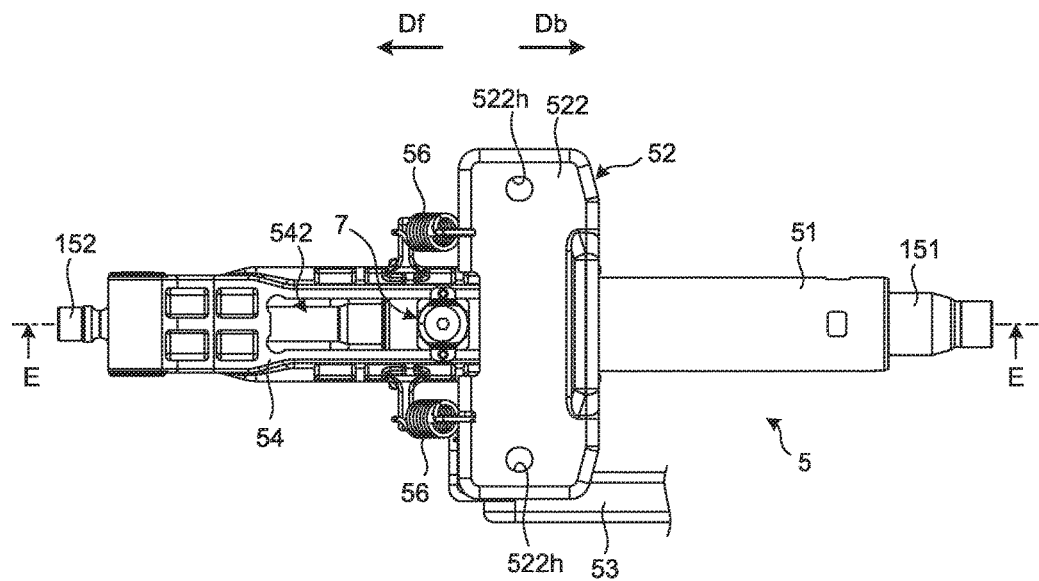
FIG. 3 is a top view of the steering device according to the embodiment.
Figure 4:
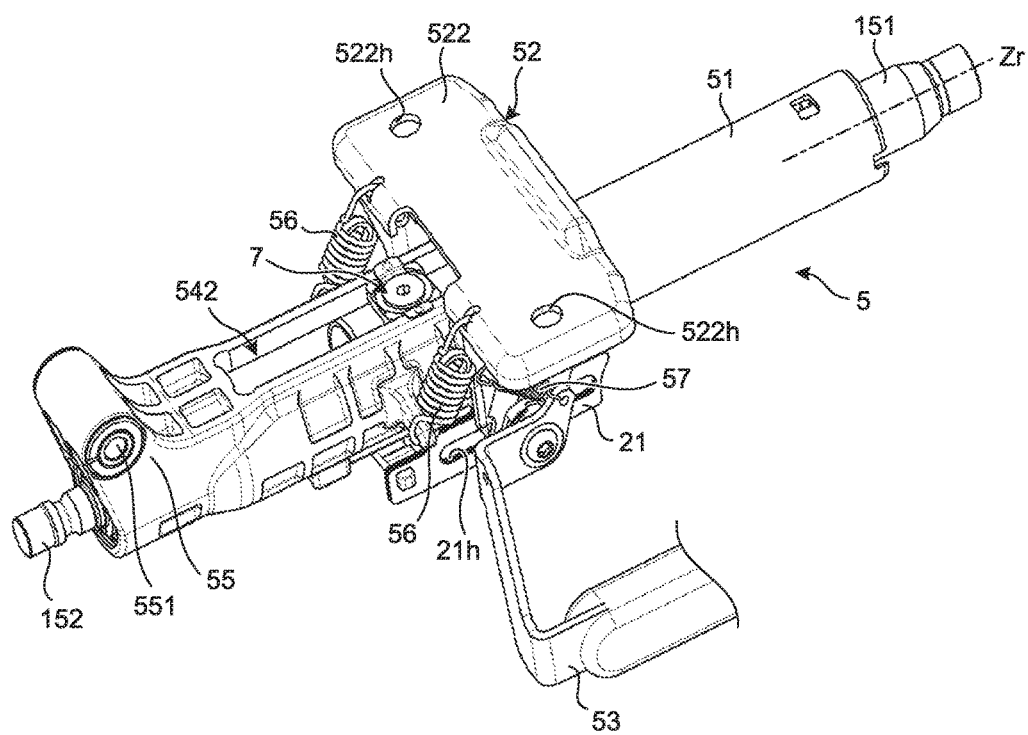
FIG. 4 is a perspective view illustrating the steering device according to the embodiment when viewed from the upside of the vehicle body.

FIG. 1 is a diagram schematically illustrating the periphery of a steering device according to the embodiment. FIG. 2 is a side view of the steering device according to the embodiment. FIG. 3 is a top view of the steering device according to the embodiment. FIG. 4 is a perspective view illustrating the steering device according to the embodiment when viewed from the upside of a vehicle body. In the following description, a front side of a vehicle body VB in a case where a steering device 100 is attached to the vehicle body VB will be simply referred to as a front side Df and a rear side of the vehicle body VB in a case where the steering device 100 is attached to the vehicle body VB will be simply referred to as a rear side Db. Further, an upside of the vehicle body VB in a case where the steering device 100 is attached to the vehicle body VB will be simply referred to as an upside and a downside of the vehicle body VB in a case where the steering device 100 is attached to the vehicle body VB will be simply referred to as a downside. In FIG. 2, a left side in the drawing is the front side Df, a right side in the drawing is the rear side Db, an upside in the drawing is an upside, and a downside in the drawing is a downside.

Steering Device

The steering device 100 includes a steering wheel 14, a steering shaft 15, a universal joint 16, a lower shaft 17, and a universal joint 18 in an order in which a force given from an operator is transmitted and is connected to a pinion shaft 19.

The steering shaft 15 includes an input shaft 151 and an output shaft 152. One end of the input shaft 151 is connected to the steering wheel 14 and the other end thereof is connected to the output shaft 152. For example, a resin coating is performed on the surface of the input shaft 151. Accordingly, the input shaft 151 is connected to the output shaft 152 through a resin. One end of the output shaft 152 is connected to the input shaft 151 and the other end thereof is connected to the universal joint 16. In the embodiment, the input shaft 151 and the output shaft 152 are formed of general steel materials such as carbon steel for machine structural use (SC material), carbon steel pipe for machine structural use (STKM material), and cold rolled steel plate (SPCC material).

One end of the lower shaft 17 is connected to the universal joint 16 and the other end thereof is connected to the universal joint 18. One end of the pinion shaft 19 is connected to the universal joint 18.

Further, the steering device 100 includes a steering column 5 that includes a cylindrical inner column 51 which supports the input shaft 151 to be rotatable about a rotation center axis Zr and a cylindrical outer column 54 into which at least a part of the inner column 51 is inserted. The inner column 51 is disposed at the rear side Db in relation to the outer column 54. For example, the inner column 51 and the outer column 54 are formed of carbon steel pipe for machine structural use (STKM material) or aluminum alloy for die casting (ADC material).

The steering device 100 includes an outer column bracket 52 which is fixed to a vehicle body side member 13 to support the outer column 54. The outer column bracket 52 is formed of general steel materials such as cold rolled steel plate (SPCC material). The outer column bracket 52 includes an attachment plate portion 522 which is fixed to the vehicle body side member 13 and a frame-shaped support portion 521 which is integrated with the attachment plate portion 522. The attachment plate portion 522 of the outer column bracket 52 includes, as illustrated in FIGS. 3 and 4, an attachment hole 522h and is fixed to the vehicle body side member 13 through a fixing member such as a bolt and the attachment hole 522h. The frame-shaped support portion 521 of the outer column bracket 52 is disposed at both sides of the outer column 54 to clamp the outer column 54. Further, the frame-shaped support portion 521 is provided with a tilt adjustment hole 521h which is an elongated hole formed to be long in the up/down direction of the vehicle body VB.

Further, the outer column 54 includes a pivot bracket 55 which is provided at a front end. The pivot bracket 55 is supported by a vehicle body side member 12 to be rotatable about a rotary shaft 551. The rotary shaft 551 is parallel to, for example, a horizontal direction. Accordingly, the outer column 54 is supported to be swingable in the vertical direction.

Figure 5:
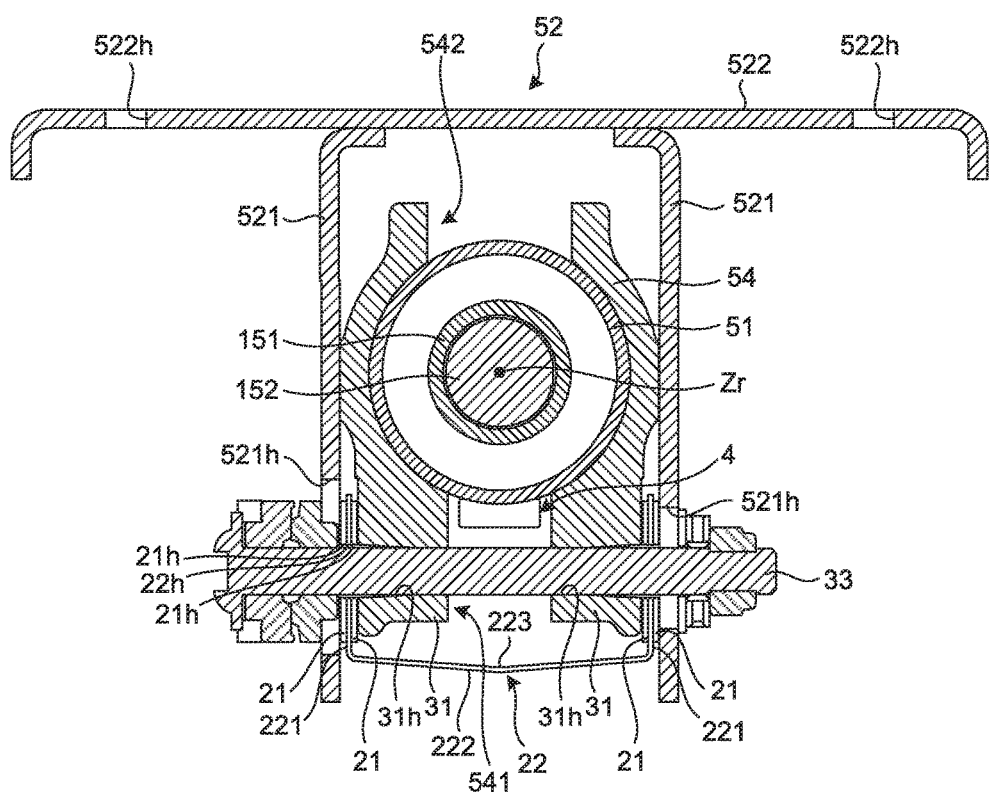
FIG. 5 is a cross-sectional view taken along a line A-A in FIG. 2.

FIG. 5 is a cross-sectional view taken along a line A-A in FIG. 2. As illustrated in FIG. 5, the outer column 54 includes two rod penetration portions 31, a first slit 541, and a second slit 542. The rod penetration portion 31 is, for example, a member that protrudes downward from the outer wall of the inner column 51 and includes a rod penetration hole 31h which is a circular hole. The rod penetration holes 31h which are respectively formed at two rod penetration portions 31 face each other with the first slit 541 interposed therebetween. Further, a part of the rod penetration portion 31 faces the frame-shaped support portion 521. A rod 33 penetrates two rod penetration holes 31h and the tilt adjustment hole 521h of the frame-shaped support portion 521 and is connected to an operation lever 53.

The first slit 541 is an elongated hole formed by notching one end from which the inner column 51 is inserted in the outer column 54. The first slit 541 is formed at a position between two rod penetration portions 31. Since the outer column 54 includes the first slit 541, an inner diameter thereof decreases when the outer column is clamped. Accordingly, in a state where the outer column 54 is clamped, the inner wall of the outer column 54 contacts the outer wall of the inner column 51 at a portion in which the outer column 54 covers the inner column 51. For this reason, a friction force is generated between the outer column 54 and the inner column 51. For example, in the embodiment, a coating using a low-friction material for reducing a friction with respect to the outer column 54 is performed on the outer wall of the inner column 51.

As illustrated in FIG. 5, the steering device 100 includes a first telescopic friction plate 21 and a second telescopic friction plate 22 in order to obtain a strong clamping and holding force for the steering column 5. For example, the first telescopic friction plate 21 and the second telescopic friction plate 22 are formed of general steel materials such as cold rolled steel plate (SPCC material). The first telescopic friction plate 21 is a plate-shaped member that includes a telescopic adjustment hole 21h which is an elongated hole formed so that the longitudinal direction is set as the direction of the rotation center axis Zr. The first telescopic friction plate 21 is disposed at both sides of, for example, the outer column 54. More specifically, the first telescopic friction plate 21 is disposed two by two in an overlapping manner at a position between the frame-shaped support portion 521 and the rod penetration portion 31. The second telescopic friction plate 22 is, for example, a member formed by bending a plate member and has a substantially U-shape when viewed from the direction of the rotation center axis Zr. The second telescopic friction plate 22 includes two friction portions 221 which are disposed between two first telescopic friction plates 21, a connection portion 222 which connects two friction portions 221 to each other, and a bent portion 223 which is provided at the connection portion 222.

The friction portion 221 includes a rod penetration hole 22h which is a circular hole. The rod 33 penetrates the telescopic adjustment hole 21h and the rod penetration hole 22h. Since the connection portion 222 connects two friction portions 221 to integrate the friction portions, an operation in which the friction portion 221 is disposed between two first telescopic friction plates 21 is easily performed. Further, since the connection portion 222 includes the bent portion 223, the connection portion can be kept in a deflected state. Accordingly, the connection portion 222 cannot easily pull the friction portion 221 even when a distance between two friction portions 221 is changed due to a change in clamping state of the outer column bracket 52. For this reason, it is possible to reduce a possibility that a gap is formed between the friction portion 221 and the first telescopic friction plate 21 when the friction portion 221 is pulled by the connection portion 222.

It is noted that the first telescopic friction plate 21 may not be essentially disposed between the frame-shaped support portion 521 and the rod penetration portion 31. For example, the first telescopic friction plate 21 may be disposed at the outside of the frame-shaped support portion 521. That is, the first telescopic friction plate 21 may be disposed at the side opposite to the rod penetration portion 31 with the frame-shaped support portion 521 interposed therebetween.

When the frame-shaped support portion 521 is clamped, the friction portions 221 of the first telescopic friction plate 21 and the second telescopic friction plate 22 are pressed against the rod penetration portion 31 of the outer column 54 by the frame-shaped support portion 521. Accordingly, friction forces are respectively generated between the frame-shaped support portion 521 and the first telescopic friction plate 21, between the first telescopic friction plate 21 and the friction portion 221 of the second telescopic friction plate 22, and between the first telescopic friction plate 21 and the rod penetration portion 31. For this reason, a surface generating a friction force increases in size compared to a case where the first telescopic friction plate 21 and the second telescopic friction plate 22 are not provided. The frame-shaped support portion 521 can more strongly clamp the outer column 54 by the first telescopic friction plate 21 and the second telescopic friction plate 22.

When the operation lever 53 is rotated, the clamping force of the frame-shaped support portion 521 is loosened and thus the friction force between the frame-shaped support portion 521 and the outer column 54 disappears or decreases. Accordingly, a tilt position of the outer column 54 can be adjusted. In the embodiment, the steering device 100 includes, as illustrated in FIG. 4, a first spring 56 and a second spring 57. The first spring 56 and the second spring 57 are, for example, coil springs. One end of the first spring 56 is attached to the attachment plate portion 522 and the other end of the first spring 56 is attached to the outer column 54. The first spring 56 suppresses the steering column 5 from falling while assisting the upward/downward movement of the steering column 5 during the tilt adjustment. One end of the second spring 57 is attached to the attachment plate portion 522 and the other end of the second spring 57 is attached to the operation lever 53. The second spring 57 applies a pre-pressure to the rod 33 through the operation lever 53. Specifically, the second spring 57 applies a pre-pressure to the rod 33 in a direction intersecting the longitudinal direction of the tilt adjustment hole 521h. Accordingly, the rattling of the rod 33 during the tilt adjustment is suppressed.

Further, when the operation lever 53 is rotated, the clamping force of the frame-shaped support portion 521 is loosened and thus the width of the first slit 541 of the outer column 54 increases. Accordingly, since a force in which the outer column 54 clamps the inner column 51 disappears, a friction force generated by the sliding of the inner column 51 disappears. Accordingly, the operator can adjust the telescopic position by pressing and pulling the inner column 51 through the steering wheel 14 after rotating the operation lever 53.

Figure 6:
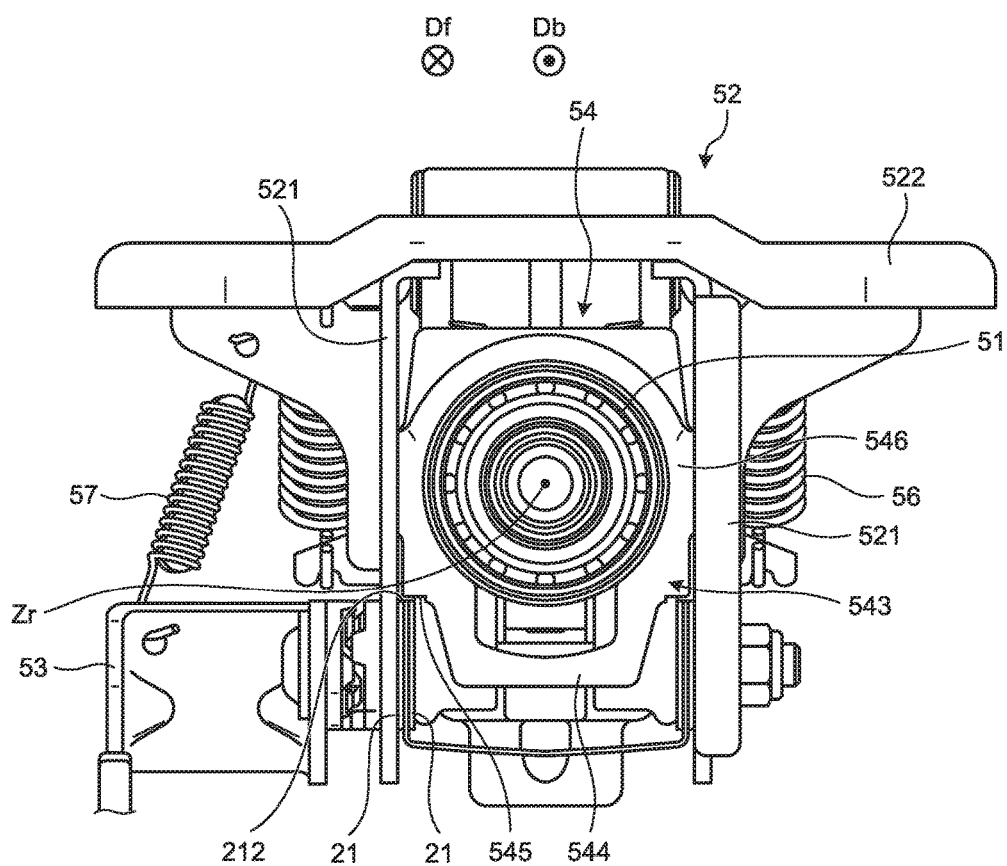
FIG. 6 is a cross-sectional view taken along a line B-B in FIG. 2.
Figure 7:
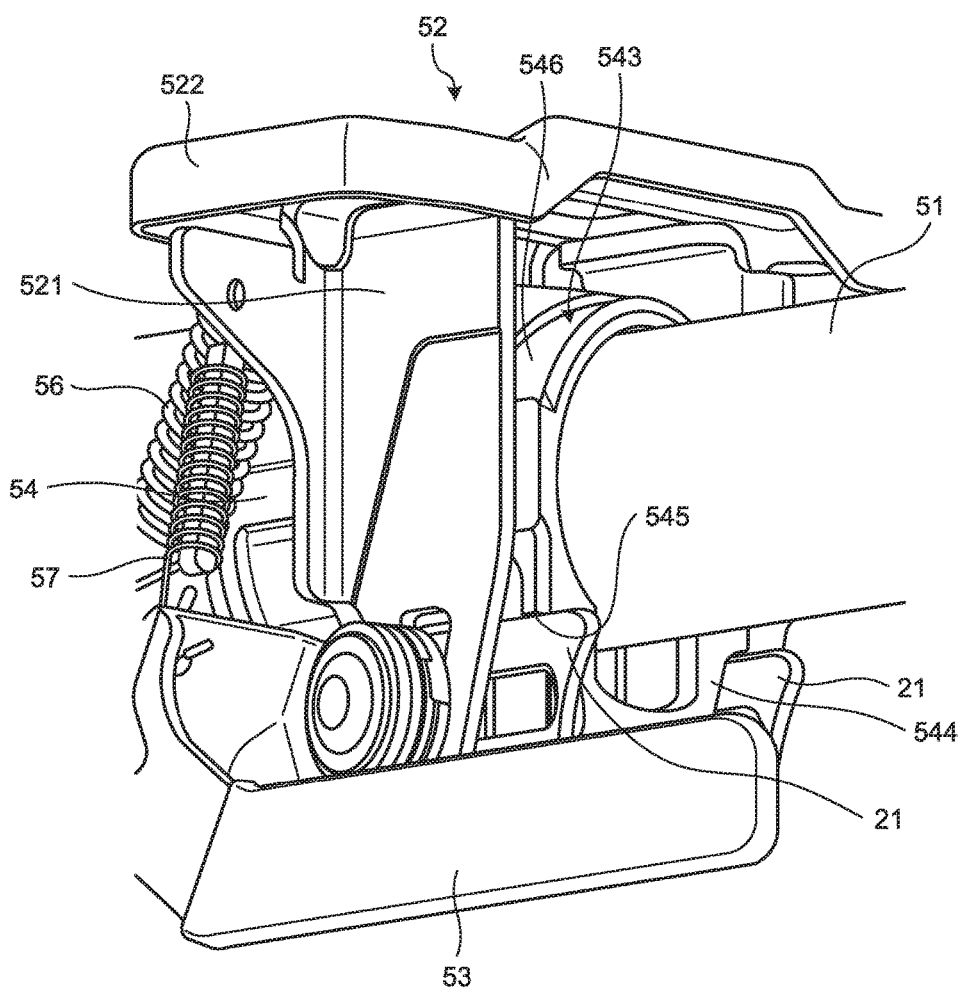
FIG. 7 is a perspective view illustrating the periphery of an outer column bracket according to the embodiment when viewed from a rear side of a vehicle body.
Figure 8:
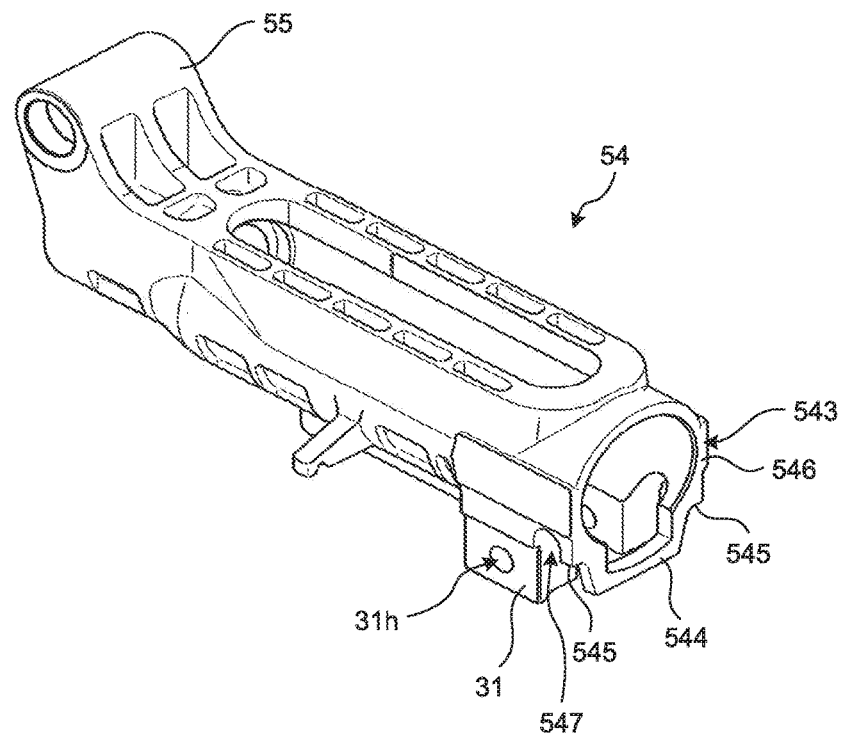
FIG. 8 is a perspective view illustrating an outer column according to the embodiment when viewed from the upside of the vehicle body.
Figure 9:
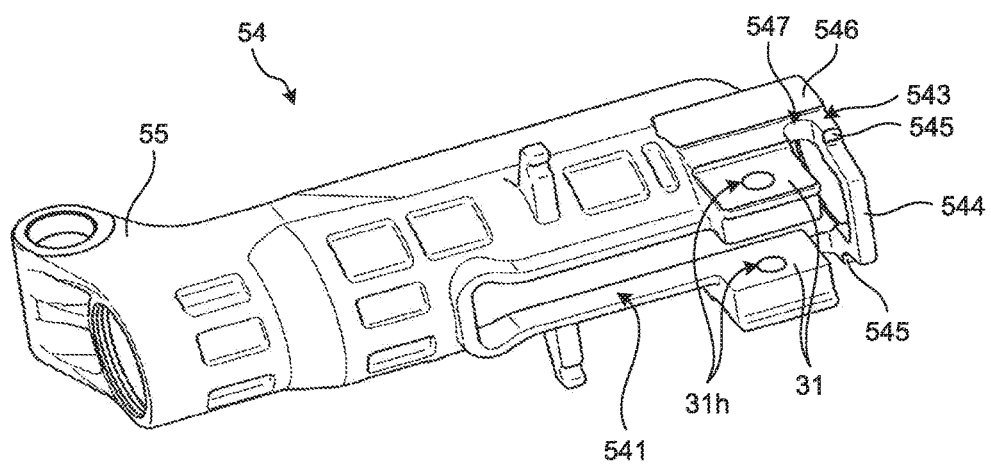
FIG. 9 is a perspective view illustrating the outer column according to the embodiment when viewed from the downside of the vehicle body.

FIG. 6 is a cross-sectional view taken along a line B-B in FIG. 2. FIG. 7 is a perspective view illustrating the periphery of the outer column bracket according to the embodiment when viewed from the rear side of the vehicle body. FIG. 8 is a perspective view illustrating the outer column according to the embodiment when viewed from the upside of the vehicle body. FIG. 9 is a perspective view illustrating the outer column according to the embodiment when viewed from the downside of the vehicle body. As illustrated in FIGS. 6 to 9, the steering device 100 includes a rotation stopper 543.

The rotation stopper 543 is integrated with, for example, the outer column 54 and is disposed at the rear end of the outer column 54. The rotation stopper 543 is an annular member that covers the inner column 51 throughout the entire periphery in the circumferential direction. As illustrated in FIGS. 8 and 9, the rotation stopper 543 is positioned at the rear side Db in relation to the rod penetration portion 31 and the first slit 541. Since the annular rotation stopper 543 is disposed at the rear side Db in relation to the first slit 541, the first slit 541 is formed as an elongated hole of which both ends are closed. Accordingly, a deformation of the outer column 54 during a clamping operation hardly concentrates on the rear end of the first slit 541. That is, a deformation of the outer column 54 during the clamping operation becomes easily equal at the front side Df and the rear side Db of the rod 33. For this reason, it is possible to easily set a friction force between the inner column 51 and the outer column 54 during the clamping operation.

As illustrated in FIGS. 8 and 9, a third slit 547 which is a groove formed in the circumferential direction of the outer column 54 is formed between the rod penetration portion 31 and the rotation stopper 543. Since the third slit 547 divides the rod penetration portion 31 and the rotation stopper 543, a displacement of the rod penetration portion 31 during a clamping operation is easily performed. For this reason, a force necessary for an operation in which the outer column 54 clamps the inner column 51 decreases. Thus, the operation lever 53 is easily operated during a clamping operation.

More specifically, the rotation stopper 543 includes, as illustrated in FIG. 6, a base portion 546, a bridge portion 544, and a rotation regulation portion 545. The base portion 546 is, for example, a member that covers the upside of the inner column 51. The base portion 546 has a substantially U-shape when viewed from the direction of the rotation center axis Zr and both side surfaces of the base portion 546 contact the inside of the frame-shaped support portion 521. A width of the base portion 546 in the axial direction of the rod 33 is substantially equal to a distance between two opposite frame-shaped support portions 521. The bridge portion 544 is, for example, a member that covers the lower side of the inner column 51 and connects the ends of the base portion 546. The bridge portion 544 has a substantially U-shape when viewed from the direction of the rotation center axis Zr and faces the inner column 51 with a gap interposed therebetween. A width of the bridge portion 544 in the axial direction of the rod 33 is smaller than that of the base portion 546. Accordingly, the lower end of the base portion 546 is provided with the rotation regulation portion 545 which serves as a step portion and is formed at each of both sides of the outer column 54. The rotation regulation portion 545 faces an upper end 212 of the first telescopic friction plate 21 with a gap interposed therebetween. In this way, since the first telescopic friction plate 21 and the rotation stopper 543 do not interfere with each other in the normal state, the adjustment of the telescopic position is not disturbed by the rotation stopper 543.

The bridge portion 544 connects the ends of the base portion 546 and is positioned at the rear side Db of the first slit 541. That is, the bridge portion 544 blocks the opening of the first slit 541. Accordingly, it is possible to suppress a foreign material from entering the first slit 541 when the inner column 51 slides relative to the outer column 54. Further, since the ends of the base portion 546 are connected by the bridge portion 544, a deformation amount of the base portion 546 during a clamping operation becomes easily equal at both sides of the bridge portion 544.

It is noted that the rotation stopper 543 may not be essentially integrated with the outer column 54, but may be attached as a separate member to, for example, the rear end of the outer column 54. Further, if the steering device 100 does not have a tilt adjustment function, the rotation stopper 543 may be provided as a protrusion which protrudes from a surface (an inner surface) facing the outer column 54 in the frame-shaped support portion 521. Further, the bridge portion 544 may not be essentially provided as a part of the rotation stopper 543 and may be disposed at a position different from the rotation stopper 543. Additionally, the bridge portion 544 may not be provided.

Figure 10:
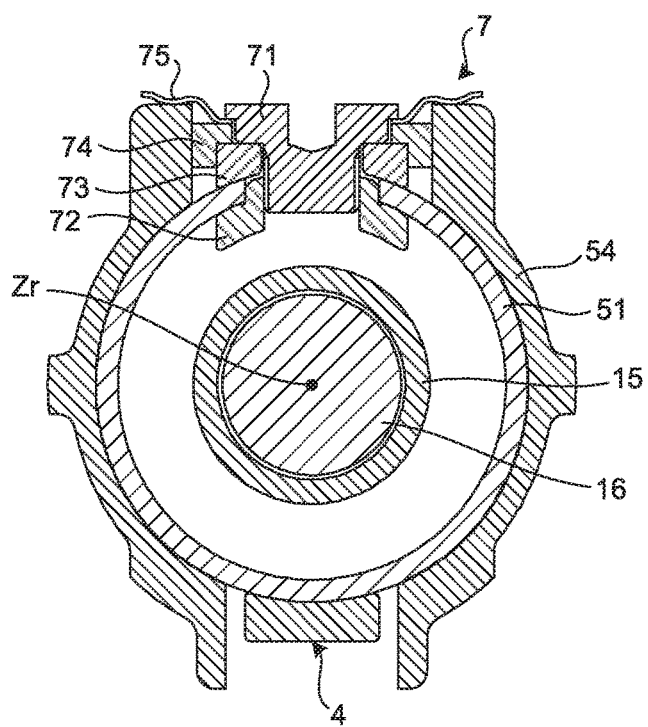
FIG. 10 is a cross-sectional view taken along a line C-C in FIG. 2.
Figure 11:
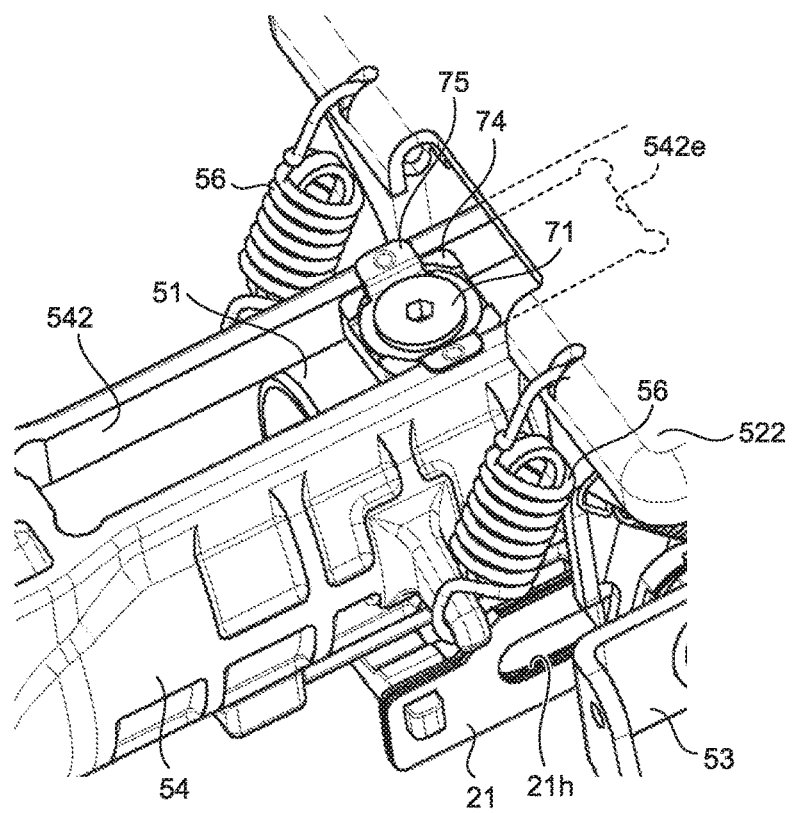
FIG. 11 is an enlarged view of the periphery of a stopper in FIG. 4.

FIG. 10 is a cross-sectional view taken along a line C-C in FIG. 2. FIG. 11 is an enlarged view in the periphery of a stopper in FIG. 4. As illustrated in FIGS. 10 and 11, the steering device 100 includes a stopper 7. The stopper 7 is attached to a position exposed by the second slit 542 in the inner column 51.

The stopper 7 includes, for example, a bolt 71, an abutting plate 72, a washer 73, a spacer 74, and an energization plate 75. The abutting plate 72 is a metallic plate-shaped member that includes a cylindrical protrusion portion. The cylindrical protrusion portion of the abutting plate 72 is fitted into the through hole formed at a position exposed by the second slit 542 in the inner column 51 from the inside of the inner column 51. The abutting plate 72 has a female screw which is formed at the inner wall of the cylindrical protrusion portion. The bolt 71 is fastened to the female screw of the abutting plate 72. The washer 73 is disposed between a bolt head portion of the bolt 71 and the abutting plate 72. A bottom surface of the washer 73 is formed in a shape which follows the shape of the outer wall of the inner column 51. Accordingly, the posture of the bolt 71 is stabilized. The spacer 74 is a member that fills a gap between the inner wall of the second slit 542 and the bolt 71 and a gap between the inner wall of the second slit 542 and the abutting plate 72. The spacer 74 is, for example, a resinous member with a through hole. The bolt 71 and the abutting plate 72 are disposed at the inside of the through hole of the spacer 74. The energization plate 75 is, for example, a metallic plate-shaped member. The energization plate 75 is fixed to be sandwiched, for example, between the head portion of the bolt 71 and the spacer 74 while contacting the outer column 54. Accordingly, the inner column 51 is electrically connected to the outer column 54 through the abutting plate 72, the bolt 71, and the energization plate 75. In the embodiment, for example, when a body earth is performed for a horn, there is a need to supply a current from the input shaft 151 toward the vehicle body VB. However, since the input shaft 151 is connected to the output shaft 152 through a resin coating, a current does not flow from the input shaft 151 to the output shaft 152. Further, since a coating of a low-friction material is performed on the outer wall of the inner column 51, a current does not flow from the outer wall of the inner column 51 to the outer column 54. Here, in the embodiment, a current which is transmitted from the input shaft 151 to the inner column 51 is caused to flow to the outer column 54 by the stopper 7.

The stopper 7 is attached to the inner column 51 and can slide while facing the inner wall of the second slit 542 for the telescopic adjustment. Since the spacer 74 is formed of a resin, the stopper 7 smoothly slides on the second slit 542. The stopper 7 regulates a telescopic position adjustment range while contacting a second inner end wall 542e which is a rear end of the second slit 542 during the adjustment of the telescopic position. Further, since the spacer 74 contacts the inner wall of the second slit 542, the stopper 7 suppresses the rotation of the inner column 51 about the rotation center axis Zr.

Figure 12:
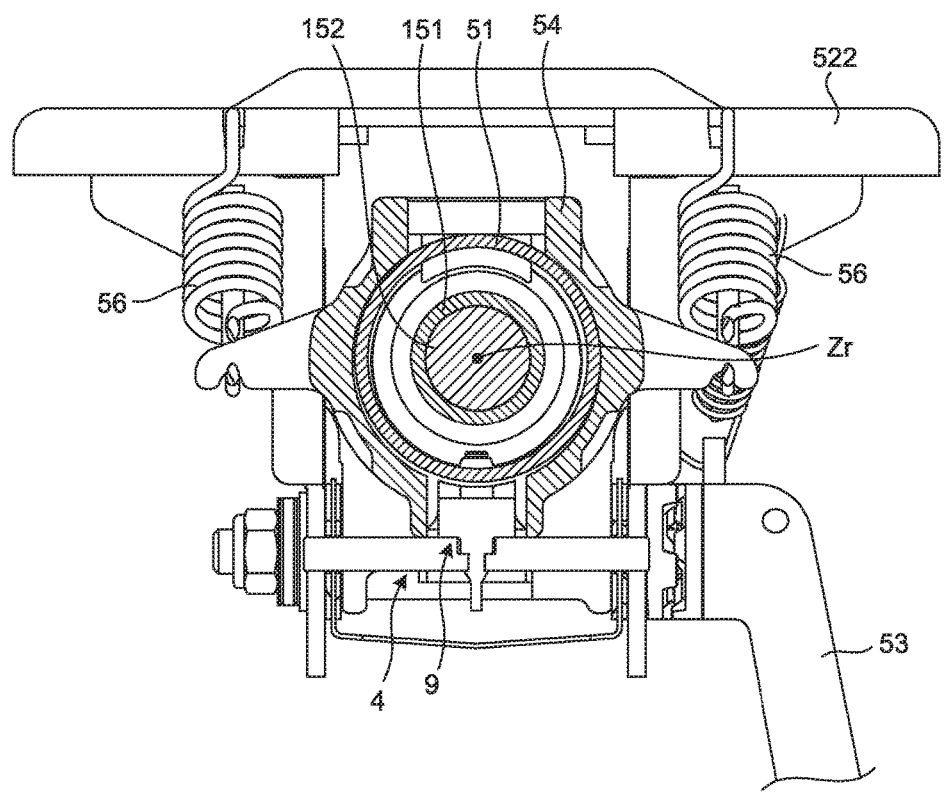
FIG. 12 is a cross-sectional view taken along a line D-D in FIG. 2.
Figure 13:
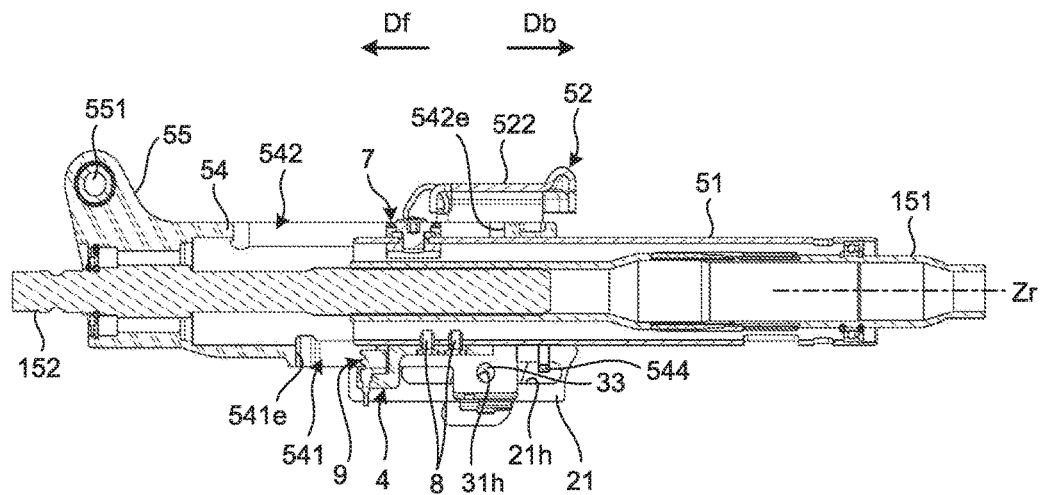
FIG. 13 is a cross-sectional view taken along a line E-E in FIG. 3.
Figure 14:
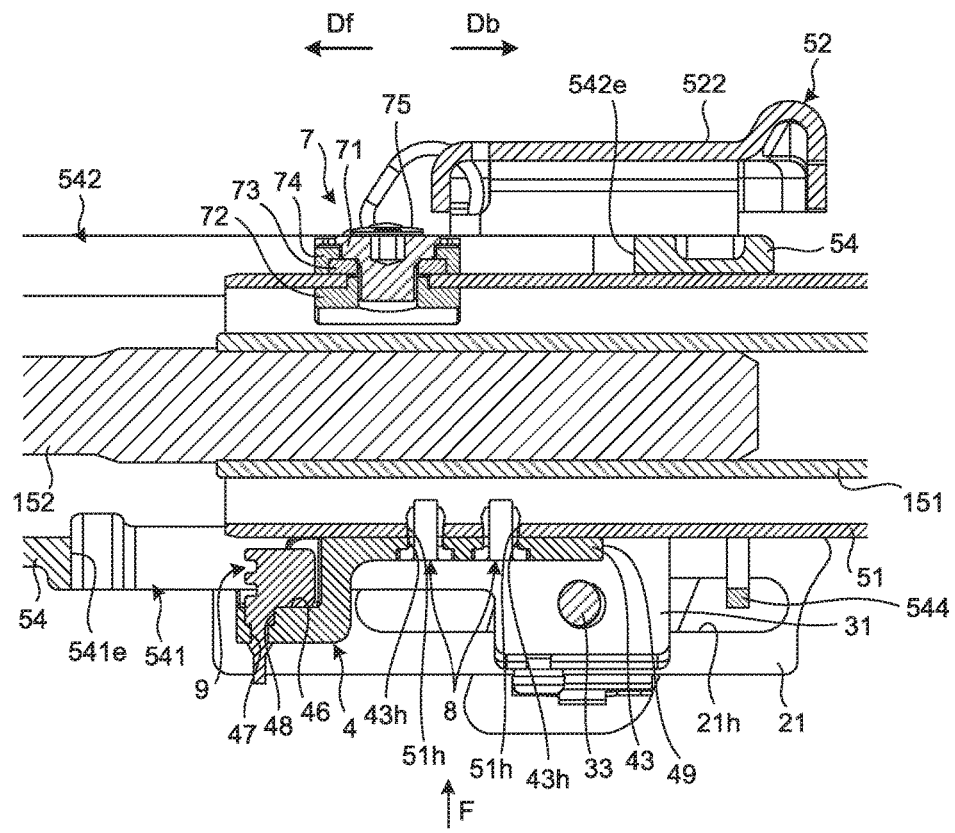
FIG. 14 is an enlarged view of the periphery of an inner column bracket in FIG. 13.
Figure 15:
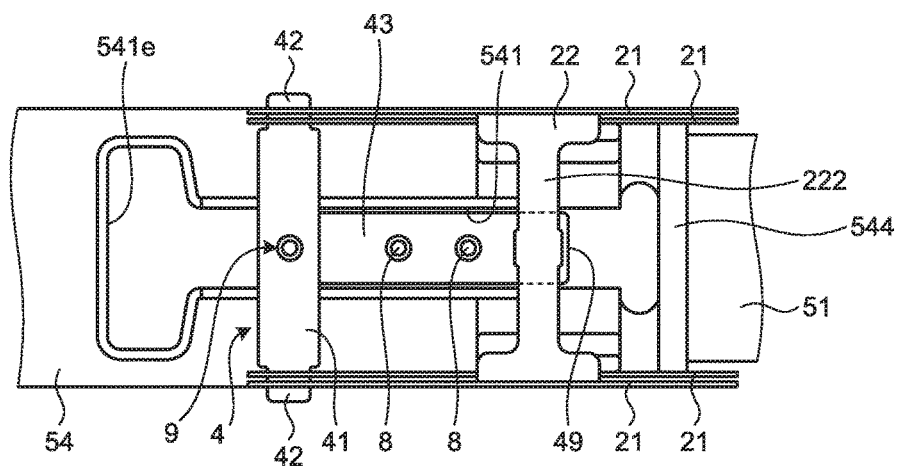
FIG. 15 is a view in a direction indicated by F in FIG. 14.
Figure 16:
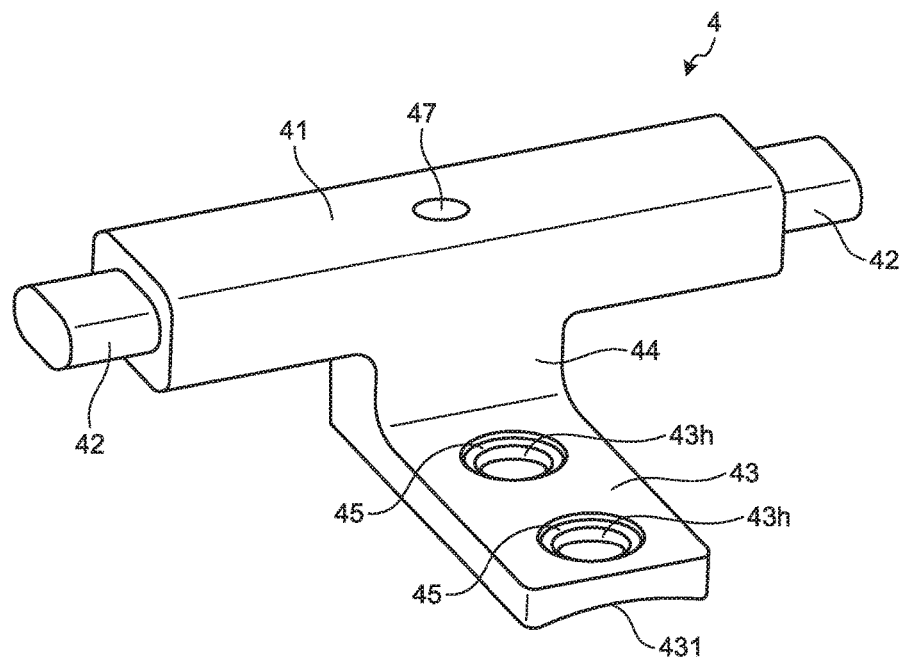
FIG. 16 is a perspective view of the inner column bracket according to the embodiment.

FIG. 12 is a cross-sectional view taken along a line D-D in FIG. 2. FIG. 13 is a cross-sectional view taken along a line E-E in FIG. 3. FIG. 14 is an enlarged view in the periphery of the inner column bracket in FIG. 13. FIG. 15 is a view in a direction indicated by F in FIG. 14. FIG. 16 is a perspective view of the inner column bracket according to the embodiment. The steering device 100 includes, for example, an inner column bracket 4 which is formed of metal such as aluminum alloy or steel. For example, as illustrated in FIG. 14, the inner column bracket 4 is disposed below the inner column 51. As illustrated in FIG. 16, the inner column bracket 4 includes, for example, an arm portion 41, an insertion portion 42, a neck portion 44, and a leg portion 43. The arm portion 41 is, as illustrated in FIG. 15, a bar-shaped portion which connects two pairs of facing first telescopic friction plates 21 at both sides of the outer column 54. The insertion portion 42 is a portion which is provided at both ends of the arm portion 41 and is inserted into a hole provided at the first telescopic friction plate 21. The insertion portion 42 is formed to be thinner than the arm portion 41. The neck portion 44 is a portion which protrudes from a part of the arm portion 41 in a direction orthogonally intersecting the longitudinal direction of the arm portion 41. The leg portion 43 is a plate-shaped portion which is provided at the end opposite to the arm portion 41 in the neck portion 44 and contacts the inner column 51. As illustrated in FIG. 16, an inner column side surface 431 of the leg portion 43 is formed in a shape which follows the shape of the outer wall of the inner column 51. The leg portion 43 includes, for example, two circular concave portions 45 which are provided at the surface opposite to the surface facing the inner column 51. Further, as illustrated in FIG. 14, a rear end 49 of the inner column bracket 4 is positioned at the rear side Db in relation to the rod 33 in accordance with the telescopic position.

Further, the inner column bracket 4 includes, as illustrated in FIG. 14, a notch portion 46, a concave portion 48, and a through hole 47. The notch portion 46 is a notch which is formed at the surface facing the inner column 51 at the front end of the inner column bracket 4. The concave portion 48 is, for example, a substantially rectangular recess which is formed at the bottom portion of the notch portion 46. The through hole 47 is provided at the bottom portion of the concave portion 48 and penetrates the arm portion 41 in the radial direction of the inner column 51. A damper 9 is disposed at the notch portion 46, the concave portion 48, and the through hole 47.

The inner column bracket 4 is connected to, as illustrated in FIG. 15, the first telescopic friction plates 21 which are disposed at both sides of the outer column 54. The inner column bracket 4 is supported by the first telescopic friction plate 21 in such a manner that the insertion portion 42 is inserted into a hole formed at the first telescopic friction plate 21. Further, the first telescopic friction plates 21 which are disposed at both sides of the outer column 54 face each other with the arm portion 41 of the inner column bracket 4 interposed therebetween. Further, the inner column bracket 4 is connected to the inner column 51 by the leg portion 43.

In order to separably connect the inner column bracket 4 and the inner column 51 to each other, a first hole 51h is opened at the inner column 51 and a second hole 43h is opened at the bottom surface of the concave portion 45 of the leg portion 43 as illustrated in FIG. 14. The first hole 51h and the second hole 43h communicate with each other. For example, in the embodiment, each of the first hole 51h and the second hole 43h is provided at two positions and both holes have the same inner periphery. When a shear pin 8 is inserted into a position across the first hole 51h and the second hole 43h, the inner column bracket 4 and the inner column 51 are separably connected to each other. Further, the first hole 51h and the second hole 43h are disposed at positions separated by the same distance from the first telescopic friction plates 21 disposed at both sides of the outer column 54.

Further, the inner column bracket 4 is disposed so that at least a part thereof is fitted to the first slit 541 of the outer column 54. Specifically, the leg portion 43 of the inner column bracket 4 is fitted to face the inner wall of the first slit 541.

The inner column bracket 4 is attached to the inner column 51 and can slide while facing the inner wall of the first slit 541 during the telescopic adjustment. The inner column bracket 4 regulates the telescopic position adjustment range while contacting a first inner end wall 541e which is the inner wall of the front end of the first slit 541 when the telescopic position is adjusted. Further, as illustrated in FIG. 13, a distance from the stopper 7 to the front end of the second slit 542 becomes longer than a distance from the inner column bracket 4 to the first inner end wall 541e. Accordingly, a movement amount (a stroke amount) of the inner column 51 toward the front side Df is ensured by a predetermined amount or more after the inner column bracket 4 is separated from the inner column 51. Thus, in the embodiment, a limit of the telescopic position at the front side Df is regulated by the inner column bracket 4 and the first inner end wall 541e and a limit of the telescopic position at the rear side Db is regulated by the stopper 7 and the second inner end wall 542e.

Figure 17:
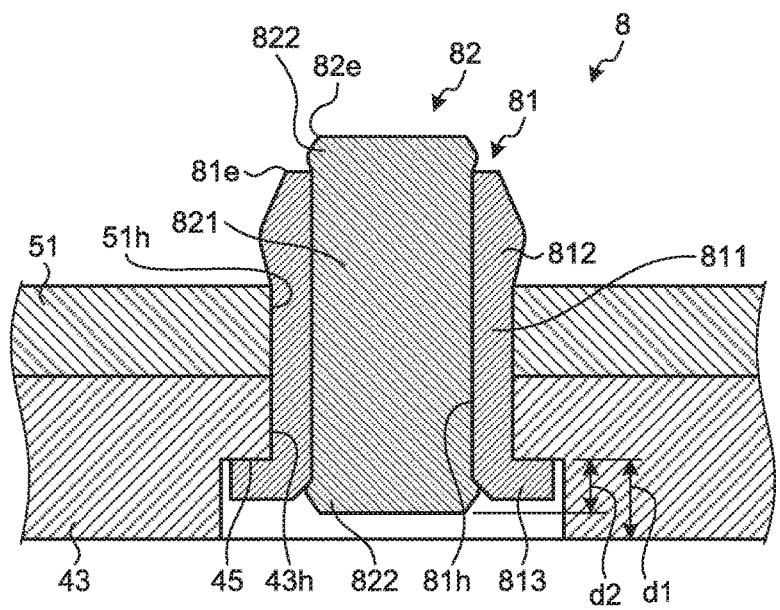
FIG. 17 is an enlarged view in the periphery of a shear pin in FIG. 14.
Figure 18:
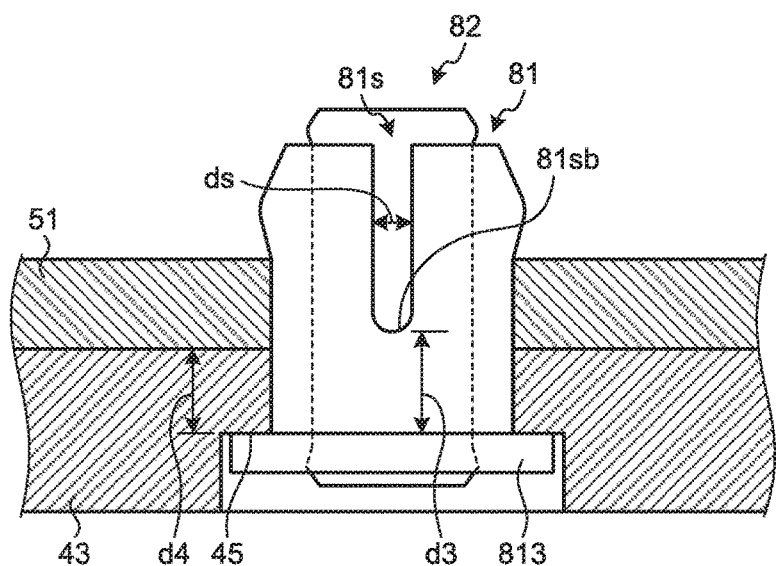
FIG. 18 is a diagram in which only the shear pin in FIG. 17 is viewed as a side view.

FIG. 17 is an enlarged view in the periphery of the shear pin in FIG. 14. FIG. 18 is a diagram in which only the shear pin in FIG. 17 is depicted as a side view. In the embodiment, the shear pin 8 includes an outer pin 81 and an inner pin 82. The outer pin 81 and the inner pin 82 are formed of, for example, a resin such as polyacetal.

As illustrated in FIG. 17, the outer pin 81 is a cylindrical member that penetrates the first hole 51h and the second hole 43h. The outer pin 81 includes, for example, a main body portion 811, a separation prevention portion 812, a flange portion 813, and a guide hole 81h. The main body portion 811 has a cylindrical shape and penetrates the first hole 51h and the second hole 43h. The separation prevention portion 812 is provided at one end of the main body portion 811 and is positioned at the inside of the inner column 51. The separation prevention portion 812 has a cylindrical shape and has an outer periphery larger than the inner periphery of the first hole 51h and the inner periphery of the second hole 43h. Accordingly, since the separation prevention portion 812 contacts the inner wall of the inner column 51, the outer pin 81 hardly falls out of the first hole 51h and the second hole 43h. The flange portion 813 is provided at the other end of the main body portion 811 and is positioned at the outside of the second hole 43h in the radial direction of the inner column 51. The flange portion 813 has, for example, a disk shape and has an outer periphery larger than the inner periphery of the first hole 51h and the inner periphery of the second hole 43h. Accordingly, since the flange portion 813 contacts the bottom face of the concave portion 45, the outer pin 81 hardly falls out of the first hole 51h and the second hole 43h. The guide hole 81h is a through hole which is formed from the flange portion 813 to the separation prevention portion 812.

In the embodiment, the outer pin 81 is inserted into the first hole 51h and the second hole 43h by press-inserting. Since the outer pin 81 is inserted into the first hole 51h and the second hole 43h, the positions of the first hole 51h and the second hole 43h are determined. For example, the separation prevention portion 812 is inserted from the second hole 43h side into the first hole 51h and the second hole 43h. The separation prevention portion 812 is formed so that the outer periphery of an end 81e opposite to the main body portion 811 becomes smaller than the inner periphery of the first hole 51h and the inner periphery of the second hole 43h. Accordingly, the separation prevention portion 812 is easily inserted into the second hole 43h.

It is noted that the outer pin 81 may be inserted from the first hole 51h side into the first hole 51h and the second hole 43h. Further, the outer pin 81 may be press-inserted in a state where a rib or the like is provided at the outer wall of the main body portion 811.

As illustrated in FIG. 18, the outer pin 81 includes one notch 81s which is provided from the separation prevention portion 812 toward the flange portion 813. When the separation prevention portion 812 is inserted into the second hole 43h, a width ds of the notch 81s in the circumferential direction of the outer pin 81 decreases so that the outer periphery of the separation prevention portion 812 decreases. Accordingly, the separation prevention portion 812 easily passes through the first hole 51h and the second hole 43h. In the following description, the width ds of the notch 81s in the circumferential direction of the outer pin 81 will be simply referred to as the width ds of the notch 81s.

It is noted that the outer pin 81 may include the notches 81s. When the notches 81s are provided, it is desirable to dispose the notches 81s at the same interval in the circumferential direction of the outer pin 81.

In a state before the outer pin 81 is inserted through the first hole 51h and the second hole 43h, the outer periphery of the main body portion 811 is larger than the inner periphery of the first hole 51h and the inner periphery of the second hole 43h. Then, since the main body portion 811 is elastically deformed while the outer pin 81 passes through the first hole 51h and the second hole 43h, the outer periphery of the main body portion 811 becomes the same as the inner periphery of the first hole 51h and the inner periphery of the second hole 43h. Accordingly, the main body portion 811 presses the inner wall of the first hole 51h and the inner wall of the second hole 43h. For this reason, a gap between the main body portion 811 and the inner wall of the first hole 51h and a gap between the main body portion 811 and the inner wall of the second hole 43h are hardly formed. Accordingly, the rattling of the outer pin 81 is suppressed.

The inner pin 82 is a member that is inserted into the guide hole 81h of the outer pin 81. The inner pin 82 includes, for example, a body portion 821 and a large diameter portion 822. The body portion 821 has a columnar shape and penetrates the guide hole 81h. The large diameter portion 822 is provided at both ends of the body portion 821 and is positioned at the outside of the guide hole 81h. The large diameter portion 822 has an outer periphery larger than the inner periphery of the guide hole 81h. Accordingly, since the large diameter portion 822 contacts the edges of both ends of the guide hole 81h, the inner pin 82 hardly falls out of the outer pin 81.

It is noted that the guide hole 81h may include a step portion which is formed at the end thereof to have an enlarged inner periphery. In this case, since the large diameter portion 822 contacts the edge of the step portion, the inner pin 82 hardly protrudes from the end of the guide hole 81h.

In the embodiment, the inner pin 82 is inserted into the guide hole 81h by press-inserting. For example, the large diameter portion 822 is inserted from the flange portion 813 side into the guide hole 81h. The large diameter portion 822 is formed so that the outer periphery of the end 82e opposite to the body portion 821 becomes smaller than the inner periphery of the outer pin 81. Accordingly, the large diameter portion 822 can be easily inserted into the guide hole 81h. Further, since the inner pin 82 includes the same large diameter portion 822 formed at both ends thereof, the inner pin can be inserted into the guide hole 81h from any end. Accordingly, the shear pin 8 is easily assembled.

In a state before the inner pin 82 is inserted into the guide hole 81h, the outer periphery of the body portion 821 is larger than the inner periphery of the guide hole 81h. Then, since the body portion 821 is elastically deformed while the body portion 821 penetrates the guide hole 81h, the outer periphery of the body portion 821 becomes the same as the inner periphery of the guide hole 81h. Accordingly, the body portion 821 presses the inner wall of the guide hole 81h outward in the radial direction. For this reason, a gap is not easily formed between the body portion 821 and the inner wall of the guide hole 81h. Accordingly, the rattling of the inner pin 82 is suppressed.

Since the body portion 821 presses the inner wall of the guide hole 81h outward in the radial direction, a force of widening the width ds of the notch 81s acts on the outer pin 81. Accordingly, friction forces which are generated among the outer pin 81, the inner wall of the first hole 51h, and the inner wall of the second hole 43h increase. Further, since the width ds of the notch 81s of the separation prevention portion 812 increases, the outer periphery of the separation prevention portion 812 increases. For this reason, the shear pin 8 in which the outer pin 81 and the inner pin 82 are integrated with each other is fixed to a position across the first hole 51h and the second hole 43h so that the inner column 51 and the inner column bracket 4 are connected to each other.

Since the steering device 100 can be assembled by the insertion of the inner pin 82 after the positions of the first hole 51h and the second hole 43h are determined by the outer pin 81, the steering device can be easily assembled.

Further, in the steering device 100 according to the embodiment, since the shear pin 8 is used in the first hole 51h and the second hole 43h, there is no need to provide a device for charging a resin member and a member for receiving the resin member compared to a case where the resin member is charged into the first hole 51h and the second hole 43h. For this reason, the steering device 100 according to the embodiment can be easily assembled.

It is noted that a depth d1 from the concave portion 45 is desirably equal to or larger than a length d2 of a portion protruding from the second hole 43h in the shear pin 8 as illustrated in FIG. 17. Accordingly, the shear pin 8 does not protrude beyond the surface of the inner column bracket 4. For this reason, the possibility that the shear pin 8 may be damaged by an external force is reduced.

When an excessive load is applied to the steering wheel 14, the load is transmitted to the inner column 51 through the input shaft 151 so that the inner column 51 moves toward the front side Df. Meanwhile, the inner column bracket 4 which is supported by the first telescopic friction plate 21 does not move. For this reason, since a shearing force is applied to the shear pin 8, the shear pin 8 is cut when the load exceeds an allowable shearing force of the shear pin 8. When the shear pin 8 is cut, a connection between the inner column 51 and the inner column bracket 4 is released. When the connection between the inner column 51 and the inner column bracket 4 is released, the inner column 51 is supported in the axial direction by a friction force generated between the inner column 51 and the outer column 54. Thus, when the operator collides with the steering wheel 14 so that an excessive load is applied thereto, a force of moving the inner column 51 is reduced and an impact is absorbed immediately after the excessive load is applied thereto.

Further, even when the shear pin 8 is cut, the outer column 54 is continuously supported by the outer column bracket 52 fixed to the vehicle body side member 13. Further, the inner column 51 is continuously supported by the outer column 54. For this reason, the steering column 5 does not fall even when the shear pin 8 is cut.

Figure 19:
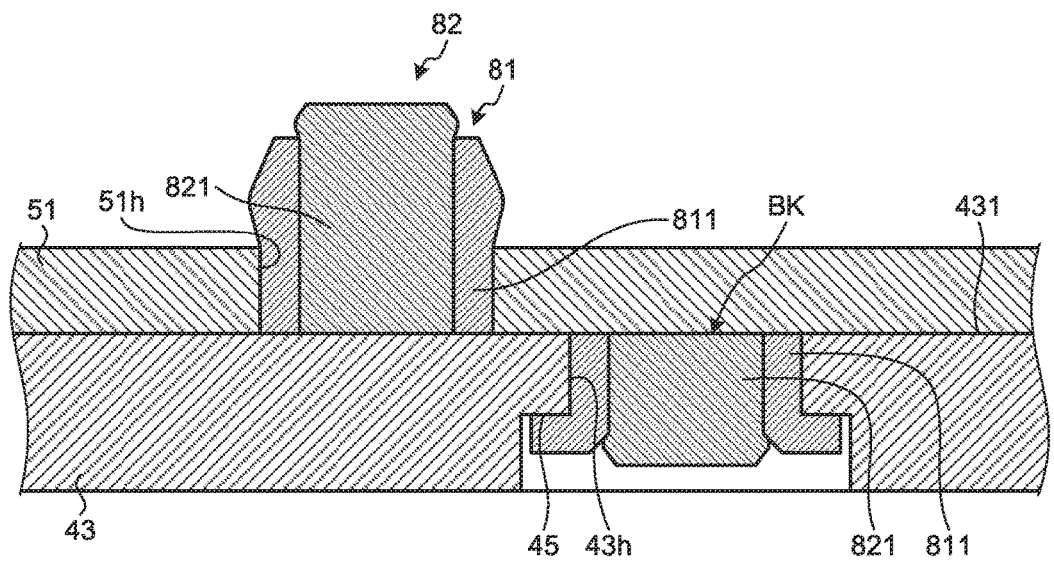
FIG. 19 is a diagram illustrating a state where the shear pin is cut.

FIG. 19 is a diagram illustrating a state where the shear pin is cut. As illustrated in FIG. 19, the shear pin 8 is cut at a section BK. The section BK is formed at a portion across the first hole 51h and the second hole 43h in the shear pin 8. In a cross-section illustrated in FIG. 19, the section BK is positioned on the extension line of the outer wall of the inner column 51, that is, the extension line of the inner column side surface 431 of the leg portion 43. The outer pin 81 is cut at the main body portion 811 and the inner pin 82 is cut at the body portion 821. For this reason, the allowable shearing force of the shear pin 8 is dependent on the cross-sectional area of the main body portion 811 and the cross-sectional area of the body portion 821 at the section BK.

As illustrated in FIG. 18, it is desirable that a distance d3 from the flange portion 813 to a front end 81sb of the notch 81s be larger than a distance d4 from the flange portion 813 to the outer wall of the inner column 51. Accordingly, the notch 81s is not included in the section BK when the shear pin 8 is cut. For this reason, since there is no cutout portion corresponding to the notch 81s in the cross-section of the main body portion 811 in the section BK, a variation in allowable shearing force of the shear pin 8 is suppressed.

Further, it is desirable to move the inner column 51 straightly in the axial direction after the shear pin 8 is cut. This is because there is a high possibility that the movement of the inner column 51 may be disturbed or a friction force generated between the inner column 51 and the outer column 54 may become larger than a predetermined value in a case where the movement direction of the inner column 51 forms a certain angle with respect to the axial direction of the outer column 54.

In the embodiment, the inner column bracket 4 is bonded to the first telescopic friction plates 21 disposed at both sides of the outer column 54 as illustrated in FIG. 15. Accordingly, when an axial load is applied to the inner column bracket 4, the inner column bracket 4 receives a clamping force from both sides of the outer column 54. For this reason, the posture of the inner column bracket 4 when the shear pin 8 is cut is stabilized. Thus, the posture of the inner column 51 when the inner column 51 starts to move is easily kept straight with respect to the axial direction. Thus, the inner column 51 can easily move to be more straight with respect to the axial direction.

Further, as illustrated in FIGS. 14 and 15, each of the first hole 51h and the second hole 43h is provided at two different positions in the axial direction. For this reason, the shear pin 8 is disposed at two different positions in the axial direction. When each of the first hole 51h and the second hole 43h is provided at one position, that is, the shear pin 8 is disposed at one position, there is a possibility that the inner column bracket 4 may rotate about the shear pin 8. In contrast, in the embodiment, since the shear pin 8 is disposed at two different positions in the axial direction, the rotation of the inner column bracket 4 is suppressed. For this reason, the posture of the inner column bracket 4 when the shear pin 8 is cut is further stabilized.

Further, the first hole 51h and the second hole 43h are disposed at positions separated by the same distance from the facing first telescopic friction plates 21 disposed at both sides with the inner column bracket 4 interposed therebetween. Accordingly, when an axial load is applied to the inner column bracket 4, the inner column bracket 4 further equally receives a clamping force from both sides of the outer column 54. For this reason, the posture of the inner column bracket 4 when the shear pin 8 is cut is stabilized. Thus, the posture of the inner column 51 when the inner column 51 starts to move is easily kept straight with respect to the axial direction. Thus, the inner column 51 can easily move to be more straight with respect to the axial direction.

Further, since the stopper 7 is fitted to the second slit 542 even when the inner column bracket 4 cannot equally receive a clamping force from both sides of the outer column 54, the inner column 51 is guided in the longitudinal direction, that is, the axial direction of the second slit 542. For this reason, the posture of the inner column bracket 4 when the shear pin 8 is cut is stabilized.

It is noted that the allowable shearing force of the shear pin 8 can be adjusted when the numbers of the first holes 51h and the second holes 43h, the cross-sectional areas of the first hole 51h and the second hole 43h, and the material of the shear pin 8 are changed. For example, the number of each of the first holes 51h and the second holes 43h may be one or more or three or more. Further, the shear pin 8 may be formed of, for example, metal including non-ferrous metal or rubber.

It is noted that the shear pin 8 may not essentially include the outer pin 81 and the inner pin 82. For example, the shear pin 8 may be formed in such a manner that a resin charged to a position across the first hole 51h and the second hole 43h is cured.

Figure 20:
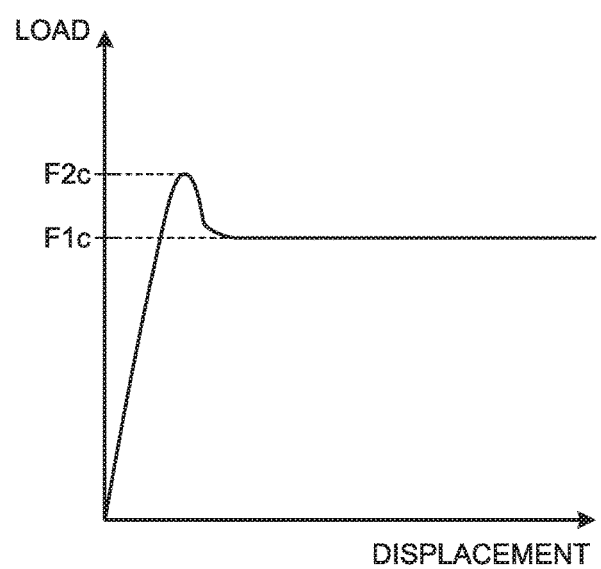
FIG. 20 is a graph illustrating a relation between a load necessary to move a steering column and a steering column displacement amount of a comparative example.
Figure 21:
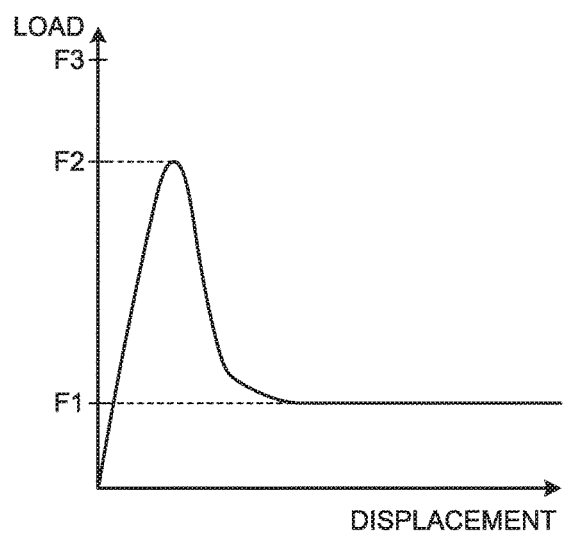
FIG. 21 is a graph illustrating a relation between a load necessary to move a steering column and a steering column displacement amount of the embodiment.

FIG. 20 is a graph illustrating a relation between a load necessary to move a steering column and a steering column displacement amount of a comparative example. FIG. 21 is a graph illustrating a relation between a load necessary to move a steering column and a steering column displacement amount of the embodiment. In FIGS. 20 and 21, a horizontal axis indicates the steering column displacement amount toward the front side Df and a vertical axis indicates the load necessary to move the steering column toward the front side Df.

The comparative example is an example in which the outer column is attached to the vehicle body through the capsule as in the technology disclosed in Patent Literature 1. In the comparative example, the outer column is disposed at the rear side Db in relation to the inner column. Thus, when an excessive load is applied to the outer column, a rod contacts the end of the telescopic adjustment hole integrated with the outer column so that the load is transmitted to the capsule through the bracket. A force F2c illustrated in FIG. 20 indicates an allowable shearing force of the capsule.

In the comparative example, the outer column is supported in the axial direction by the friction force generated between the inner and outer columns due to the clamping of the bracket. A force F1c illustrated in FIG. 20 indicates the friction force used to support the outer column. The force F1c is smaller than the force F2c. In order to prevent the outer column from being moved by a load applied in a normal use state, the force F1c needs to be kept at a predetermined value or more.

In the comparative example, when a load which is equal to or larger than the force F2c is applied to the outer column, the capsule is cut and the outer column is separated from the vehicle body. Subsequently, the outer column moves in the axial direction while absorbing the impact by the friction force generated between the inner and outer columns. However, since the force F1c is kept at a predetermined value or more as described above, it is difficult to protect the operator from the secondary collision by the smooth movement of the outer column.

Meanwhile, in the embodiment, the inner column 51 is supported in the axial direction by a first friction force generated between the inner column and the outer column 54 due to the clamping of the outer column bracket 52 and a second friction force generated between the first telescopic friction plate 21 and the members (the outer column bracket 52, the second telescopic friction plate 22, and the outer column 54) contacting the first telescopic friction plate 21. A force F1 illustrated in FIG. 21 indicates the first friction force and a force F3 indicates the sum of the first friction force and the second friction force. Further, a force F2 illustrated in FIG. 21 indicates the allowable shearing force of the shear pin 8. The force F2 is smaller than the force F3 and is larger than the force F1.

In the embodiment, when a load which is equal to or larger than the force F2 is applied to the inner column 51, the shear pin 8 is cut so that the inner column 51 is separated from the inner column bracket 4. Accordingly, since a connection between the inner column 51 and the first telescopic friction plate 21 is released, the above-described second friction force does not act on the inner column 51. For this reason, the inner column 51 moves in the axial direction while absorbing the impact by the above-described first friction force after the shear pin 8 is cut. In the steering device 100 according to the embodiment, when the first friction force is set to a small value, it is possible to more easily protect the operator from the secondary collision by the smooth movement of the inner column 51.

In the embodiment, even when the setting value of the first friction force is set to a small value, a degree in which the first friction force decreases in the force of supporting the inner column 51 in the axial direction can be compensated by the second friction force. For this reason, in the steering device 100 according to the embodiment, when the setting value of the first friction force and the setting value of the second friction force are adjusted, it is possible to suppress the movement of the inner column 51 due to the load applied in the normal use state and to more easily protect the operator from the secondary collision.

Incidentally, if the inner column bracket 4 contacts the first inner end wall 541*e* during the telescopic adjustment after the operation of the operation lever 53 in the normal use state, a shearing force acts on the shear pin 8. For this reason, when a force applied to the inner column 51 during the telescopic adjustment increases excessively, there is a possibility that the shear pin 8 may be cut due to the telescopic adjustment. Here, the steering device 100 according to the embodiment includes the damper 9 as described above. As illustrated in FIG. 14, the damper 9 is formed of, for example, synthetic rubber and is attached to the front end of the inner column bracket 4. More specifically, the damper 9 is inserted through the through hole 47 of the inner column bracket 4 and is fixed to the inner column bracket 4.

If the telescopic position becomes a foremost position during the telescopic adjustment after the operation of the operation lever 53, the damper 9 contacts the first inner end wall 541*e*. When a force is applied to the inner column 51 while the damper 9 contacts the first inner end wall 541*e*, a reaction force is applied from the first inner end wall 541*e* to the damper 9. Accordingly, since the damper 9 is elastically deformed, a part of the force applied to the damper 9 is consumed to elastically deform the damper 9. Then, a force which is smaller than the force applied to the damper 9 is transmitted to the inner column bracket 4 and a shearing force which is substantially the same as the force transmitted to the inner column bracket 4 acts on the shear pin 8. For this reason, the shearing force acting on the shear pin 8 becomes smaller than the force applied to the inner column 51. Thus, the steering device 100 according to the embodiment can protect a separation mechanism by suppressing the shear pin 8 from being cut during the telescopic adjustment.

Figure 22:
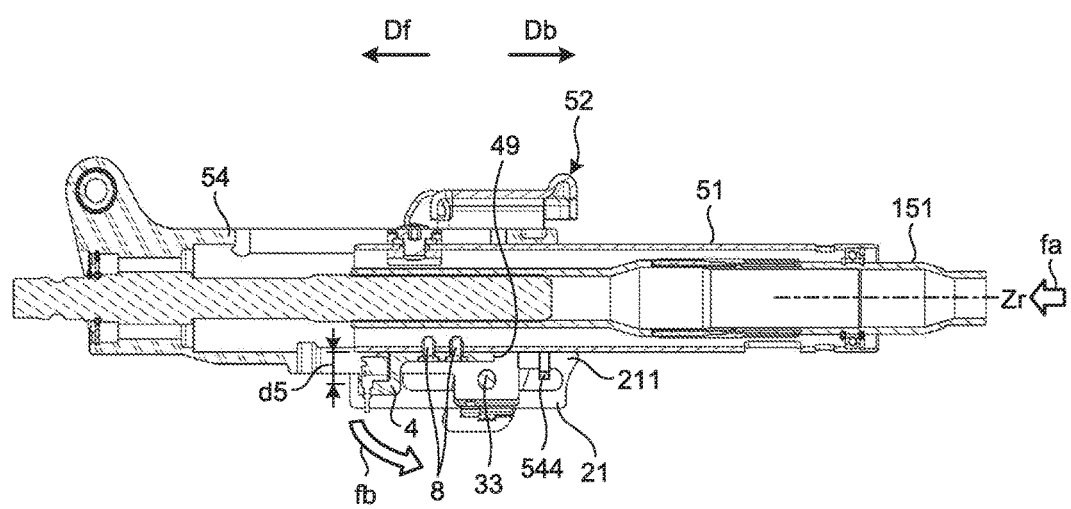
FIG. 22 is an explanatory diagram illustrating an operation of a telescopic friction plate in the event of a secondary collision.
Figure 23:
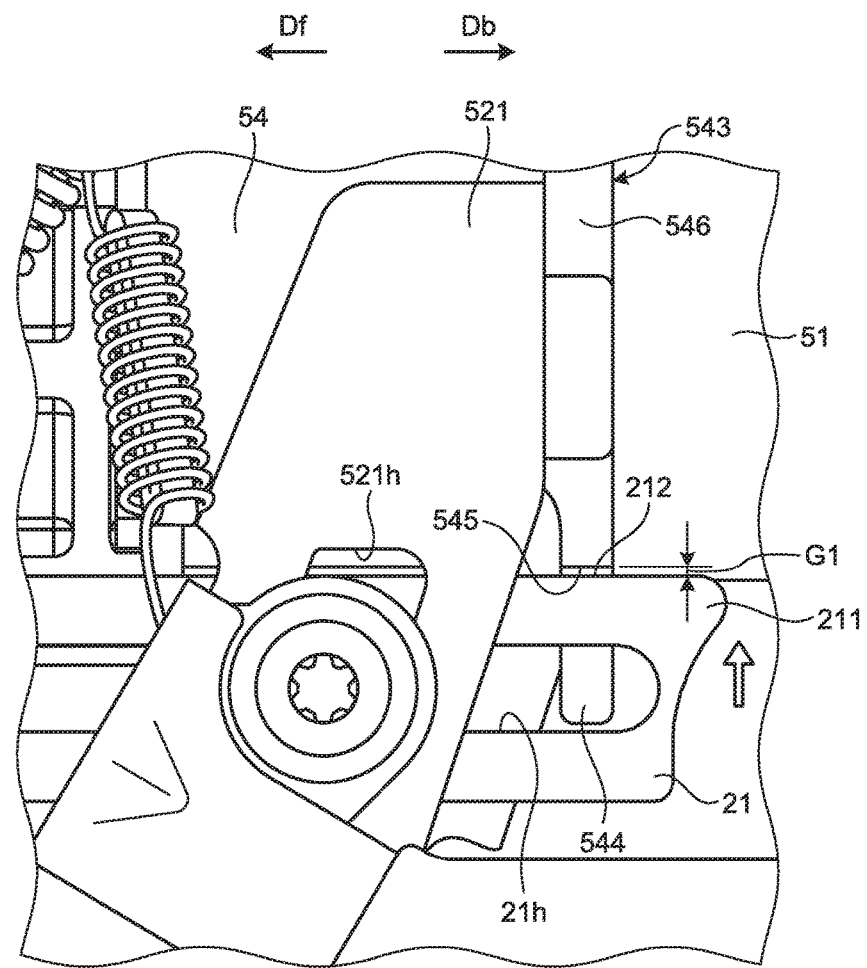
FIG. 23 is an enlarged view in the periphery of a rotation stopper in FIG. 2.
Figure 24:
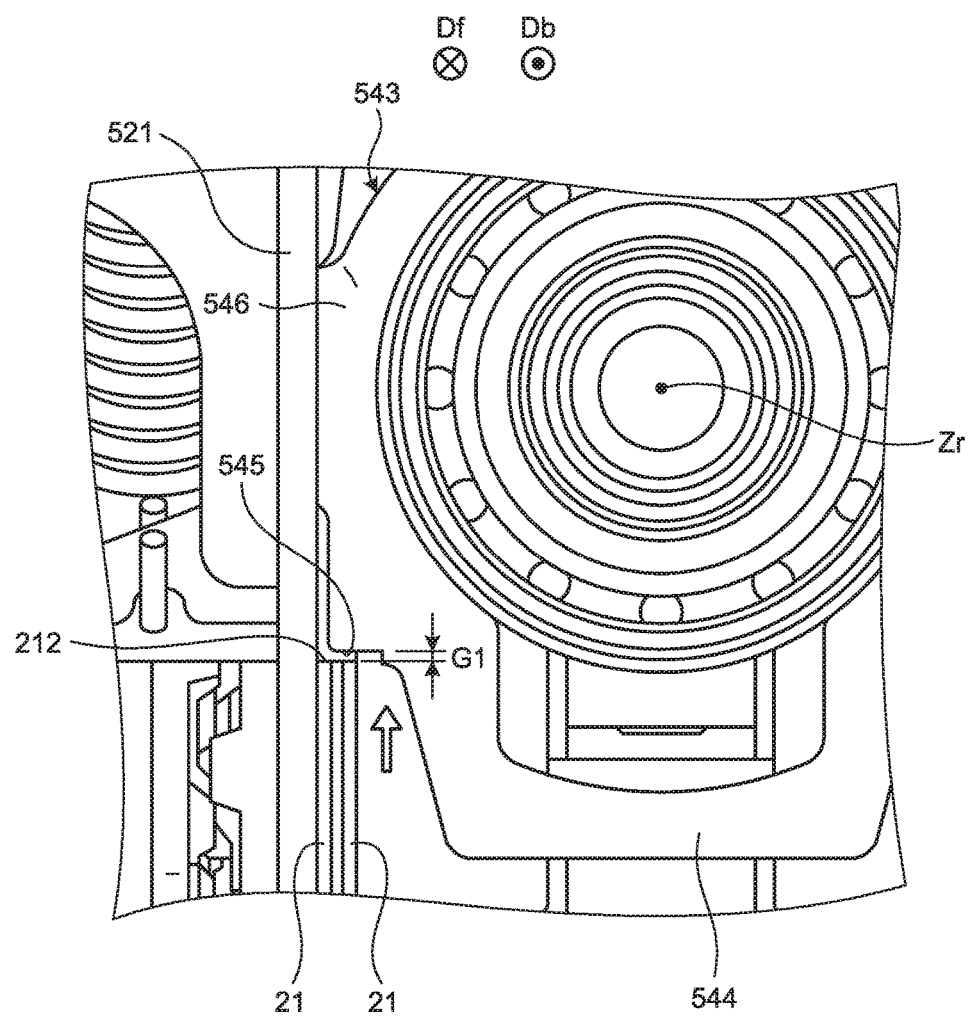
FIG. 24 is an enlarged view in the periphery of a rotation stopper in FIG. 6.

FIG. 22 is an explanatory diagram illustrating an operation of the telescopic friction plate in the event of the secondary collision. FIG. 23 is an enlarged view in the periphery of the rotation stopper in FIG. 2. FIG. 24 is an enlarged view in the periphery of the rotation stopper in FIG. 6.

As illustrated in FIG. 22, a force fa is applied to the steering device 100 in a direction toward the front side Df in the event of the secondary collision and the force fa is transmitted to the shear pin 8 so that the shear pin 8 is cut. Meanwhile, there is a possibility that at least a part of the force fa may be transmitted from the inner column 51 to the inner column bracket 4 through the shear pin 8 when the shear pin 8 is cut. Further, there is a possibility that the inner column 51 may move toward the front side Df while contacting the inner column bracket 4 after the shear pin 8 is cut. In the inner column bracket 4, a force action point is a connection portion with respect to the inner column 51, that is, the inner column side surface 431 illustrated in FIG. 16 and a support point is a connection portion with respect to the first telescopic friction plate 21, that is, the insertion portion 42 illustrated in FIG. 16. As illustrated in FIG. 22, an action point is separated from the support point by a distance d5. For this reason, when a force is applied from the inner column 51 to the inner column bracket 4 in a direction toward the front side Df, a moment (a counter-clockwise moment in FIG. 22) fb of rotating the inner column bracket 4 toward the front side Df is generated. The moment fb rotates the inner column bracket 4 and the first telescopic friction plate 21 together about the rod 33.

Further, in a case where the first slit 541 and the inner column bracket 4 are disposed at the lower side as illustrated in the embodiment, there is a possibility that the inner column bracket 4 and the first telescopic friction plate 21 may be rotated by gravity after the shear pin 8 is cut.

If the rotation of the first telescopic friction plate 21 is not regulated, there is a possibility that the rear end 49 of the inner column bracket 4 may move upward due to the moment fb in accordance with the telescopic position in the event of the secondary collision. Accordingly, the edge of the rear end 49 contacts the inner column 51. For this reason, there is a possibility that the movement of the inner column 51 toward the front side Df may be disturbed. That is, since the friction force between the inner column bracket 4 and the inner column 51 increases, there is a possibility that the impact absorbing capability of the steering device 100 may decrease.

In contrast, the steering device 100 according to the embodiment includes the rotation stopper 543 as described above. When the moment fb is generated, a rear end 211 which is positioned at the rear side Db in relation to the rod 33 in the first telescopic friction plate 21 moves upward as illustrated in FIG. 23. When the rear end 211 moves upward, the upper end 212 contacts the rotation regulation portion 545 of the rotation stopper 543. Accordingly, since the rotation of the first telescopic friction plate 21 is regulated, the rotation of the inner column bracket 4 connected to the first telescopic friction plate 21 is regulated. Thus, the steering device 100 according to the embodiment can suppress a decrease in impact absorbing capability due to the rotation of the inner column bracket 4.

Further, the rotation regulation portion 545 is provided at both sides of the outer column 54 as described above. Accordingly, when the first telescopic friction plate 21 rotates about the rod 33, each of the first telescopic friction plates 21 respectively provided at both sides of the outer column 54 contacts the rotation regulation portion 545 of the rotation stopper 543. For this reason, the rotation of the inner column bracket 4 is regulated from both sides of the outer column 54. Thus, the rotation of the inner column bracket 4 can be more easily regulated compared to a case where the rotation regulation portion 545 is provided only at one side of the outer column 54.

It is desirable that the upper end 212 may contact the rotation regulation portion 545 before the rear end 49 of the inner column bracket 4 contacts the inner column 51 after the shear pin 8 is cut. For this reason, a gap G1 from the rotation regulation portion 545 to the upper end 212 illustrated in FIG. 23 is set to a predetermined size. More specifically, the size of the gap G1 is set in response to the size of the gap formed between the rear end 49 of the inner column bracket 4 and the inner column 51 and the telescopic position adjustment range.

As described above, the steering device 100 according to the embodiment includes the inner column 51, the outer column 54, the outer column bracket 52, the rod 33, the inner column bracket 4, the shear pin 8, and the rotation stopper 543. The inner column 51 is a cylindrical member that rotatably supports the input shaft 151 connected to the steering wheel 14 and has the first hole 51h opened therein. The outer column 54 has a cylindrical shape into which at least a part of the inner column 51 is inserted and includes the first slit 541 formed by notching one end from which the inner column 51 is inserted. The outer column bracket 52 is fixed to the vehicle body side member 13 to support the outer column 54 and clamps the outer column 54 along with the telescopic friction plate (the first telescopic friction plate 21) which is a plate member. The rod 33 penetrates the telescopic friction plate (the first telescopic friction plate 21) and the outer column bracket 52 and supports the telescopic friction plate (the first telescopic friction plate 21). The inner column bracket 4 is supported by the telescopic friction plate (the first telescopic friction plate 21) and the second hole 43h is opened. The shear pin 8 separably connects the inner column 51 and the inner column bracket 4 at a position across the first hole 51h and the second hole 43h. The rotation stopper 543 is provided at the rear side Db in relation to the rod 33 and contacts the telescopic friction plate (the first telescopic friction plate 21) when the telescopic friction plate (the first telescopic friction plate 21) rotates about the rod 33 in the event of the secondary collision.

Accordingly, in the steering device 100 according to the embodiment, when an excessive load is applied to the steering wheel 14, the load is transmitted to the inner column 51 through the input shaft 151 so that the inner column 51 moves toward the front side Df. Meanwhile, the inner column bracket 4 which is supported by the first telescopic friction plate 21 does not move. For this reason, since a shearing force is applied to the shear pin 8, the shear pin 8 is cut when the load exceeds the allowable shearing force of the shear pin 8. When the shear pin 8 is cut, a connection between the inner column 51 and the inner column bracket 4 is released. When the connection between the inner column 51 and the inner column bracket 4 is released, the inner column 51 is supported in the axial direction due to the friction force generated between the inner column 51 and the outer column 54. For this reason, the inner column 51 of the steering column 5 can move toward the front side Df. Further, the outer column 54 is continuously supported by the outer column bracket 52 fixed to the vehicle body side member 13 even when the shear pin 8 is cut. Further, the inner column 51 is continuously supported by the outer column 54. For this reason, the steering column 5 does not fall even when the shear pin 8 is cut. Thus, the steering device 100 according to the embodiment can suppress the steering column 5 from falling due to an erroneous operation even when the setting value of the separation load (the allowable shearing force of the shear pin 8) at which the steering column 5 moves toward the front side Df decreases.

Further, when the first telescopic friction plate 21 rotates in the event of the secondary collision, the rotation stopper 543 contacts the first telescopic friction plate 21. Accordingly, since the rotation of the first telescopic friction plate 21 is regulated, the rotation of the inner column bracket 4 connected to the first telescopic friction plate 21 is regulated.

For this reason, since the inner column bracket 4 hardly contacts the inner column 51, the movement of the inner column 51 toward the front side Df is hardly disturbed by the inner column bracket 4. Thus, the steering device 100 according to the embodiment can suppress a decrease in impact absorbing capability due to the rotation of the inner column bracket 4.

In the steering device 100 according to the embodiment, the rotation regulation portion 545 of the rotation stopper 543 is disposed to be separated from the upper end 212 of the telescopic friction plate (the first telescopic friction plate 21) with the gap G1 interposed therebetween before the secondary collision occurs.

Accordingly, since the first telescopic friction plate 21 and the rotation stopper 543 do not interfere with each other in the normal state, the adjustment of the telescopic position is not disturbed by the rotation stopper 543. Thus, the steering device 100 can suppress a decrease in impact absorbing capability due to the rotation of the inner column bracket 4 in the event of the secondary collision and can smoothly adjust the telescopic position in the normal state.

In the steering device 100 according to the embodiment, the telescopic friction plate (the first telescopic friction plate 21) is disposed at both sides of the outer column 54. The rotation stopper 543 contacts each of the telescopic friction plates (the first telescopic friction plates 21) provided at both sides of the outer column 54 when the telescopic friction plate (the first telescopic friction plate 21) rotates about the rod 33.

Accordingly, the rotation of the inner column bracket 4 is regulated from both sides of the outer column 54. Thus, the rotation of the inner column bracket 4 can be more easily regulated compared to a case where the rotation regulation portion 545 is provided only at one side of the outer column 54.

In the steering device 100 according to the embodiment, the rotation stopper 543 is integrated with the outer column 54.

Accordingly, the steering device 100 can suppress a decrease in impact absorbing capability due to the rotation of the inner column bracket 4 and prevent an increase in the number of components. Further, since the rotation stopper 543 is integrated with the outer column 54, the rigidity thereof can be improved.

In the steering device 100 according to the embodiment, the rotation stopper 543 is an annular member that is positioned at the rear side Db in relation to the first slit 541 and surrounds the entire periphery of the inner column 51.

Accordingly, a deformation of the outer column 54 during the clamping operation hardly occurs at the rear end of the first slit 541. That is, a deformation of the outer column 54 due to the clamping becomes easily equal at the front side Df and the rear side Db of the rod 33. For this reason, it is possible to easily set the friction force between the inner column 51 and the outer column 54 during the clamping operation.

First Modified Example

Figure 25:
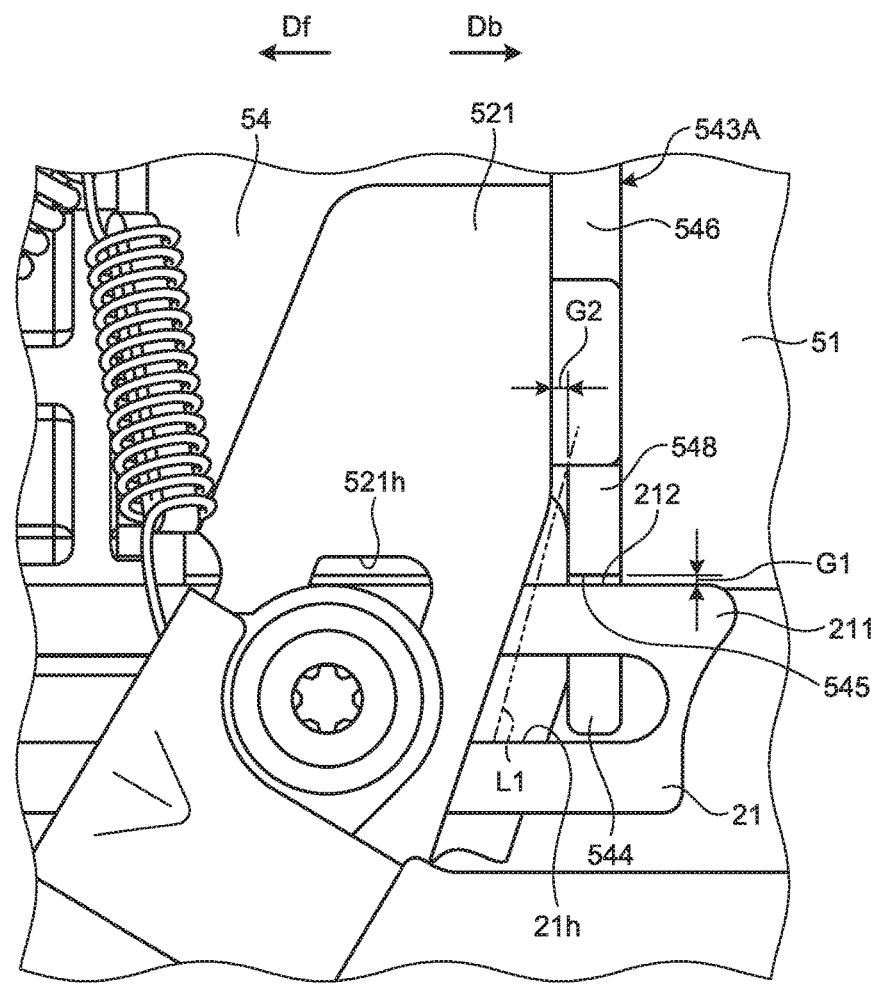
FIG. 25 is an enlarged side view in the periphery of a rotation stopper according to a first modified example.
Figure 26:
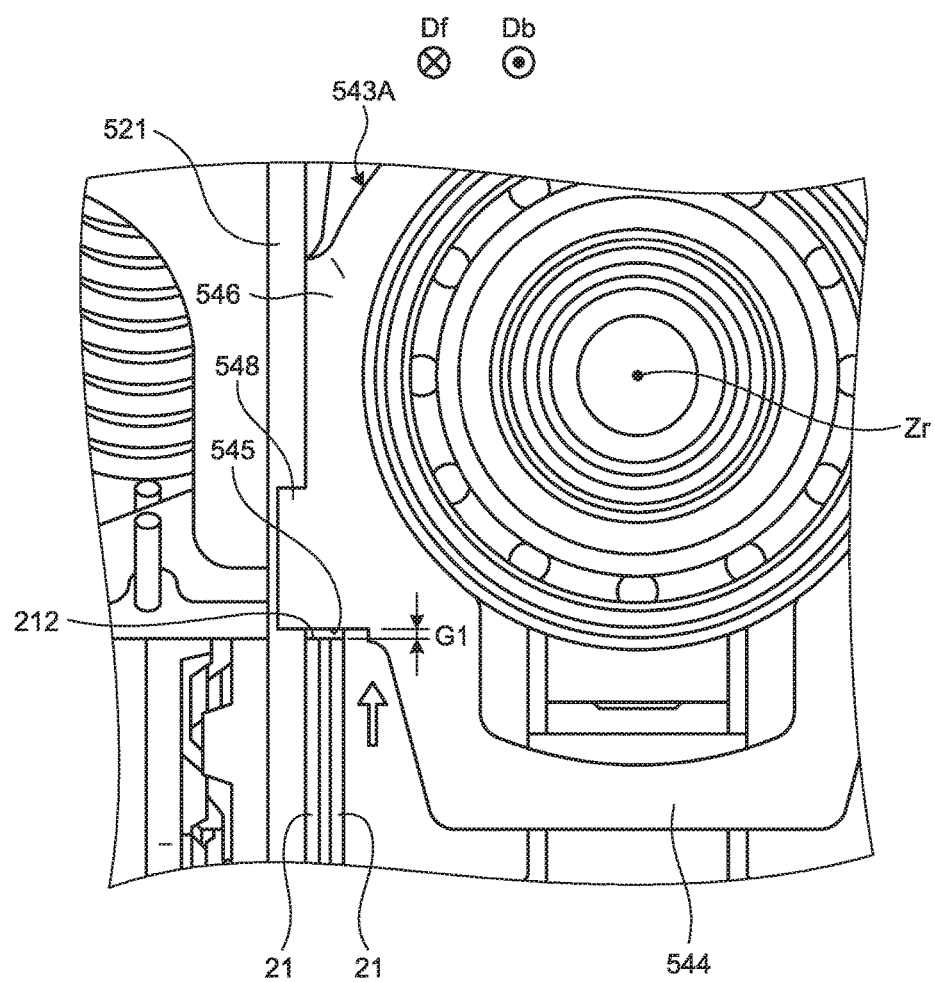
FIG. 26 is an enlarged cross-sectional view in the periphery of a rotation stopper according to a first modified example.

FIG. 25 is an enlarged side view in the periphery of a rotation stopper according to a first modified example. FIG. 26 is an enlarged cross-sectional view in the periphery of the rotation stopper according to the first modified example. It is noted that the same reference numeral will be given to the same component as that of the above-described embodiment and a repetitive description thereof will be omitted.

As illustrated in FIGS. 25 and 26, a rotation stopper 543A according to the first modified example includes a protrusion portion 548. The protrusion portion 548 is a protrusion which protrudes from the side surface of the base portion 546 outward in the radial direction of the outer column 54. The protrusion portion 548 faces the upper end 212 of the first telescopic friction plate 21 with the gap G1 interposed therebetween. That is, the protrusion portion 548 includes the rotation regulation portion 545. As illustrated in FIG. 26, the protrusion portion 548 overlaps the frame-shaped support portion 521 when viewed from the direction of the rotation center axis Zr.

In the steering device 100 according to the first modified example, the telescopic friction plate (the first telescopic friction plate 21) is disposed between the frame-shaped support portion 521 of the outer column bracket 52 and the rod penetration portion 31 of the outer column 54 (see FIG. 5). The rotation stopper 543A includes the protrusion portion 548 which overlaps the frame-shaped support portion 521 of the outer column bracket 52 when viewed from the axial direction (the direction of the rotation center axis Zr) of the outer column 54.

Accordingly, in the rotation stopper 543A according to the first modified example, the area of the rotation regulation portion 545 becomes larger outward in the radial direction of the outer column 54 (toward the frame-shaped support portion 521) compared to the above-described embodiment. For this reason, in the first modified example, the upper end 212 easily contacts the rotation regulation portion 545 of the rotation stopper 543A when the first telescopic friction plate 21 rotates. Thus, the rotation of the inner column bracket 4 is easily suppressed.

Further, as illustrated in FIG. 25, the gap G2 is formed between the protrusion portion 548 and the frame-shaped support portion 521. Since the protrusion portion 548 overlaps the frame-shaped support portion 521 when viewed from the direction of the rotation center axis Zr, there is a possibility that the protrusion portion 548 may interfere with the frame-shaped support portion 521 when the tilt position is adjusted. For this reason, the gap G2 is set to a size in which the protrusion portion 548 does not interfere with the frame-shaped support portion 521 even when the protrusion portion 548 moves due to the adjustment of the tilt position. In other words, as illustrated in FIG. 25, the size of the gap G2 is set so that a track L1 depicted by the edge near the frame-shaped support portion 521 of the protrusion portion 548 during the adjustment of the tilt position is positioned at the rear side Db in relation to the frame-shaped support portion 521.

Second Modified Example

Figure 27:
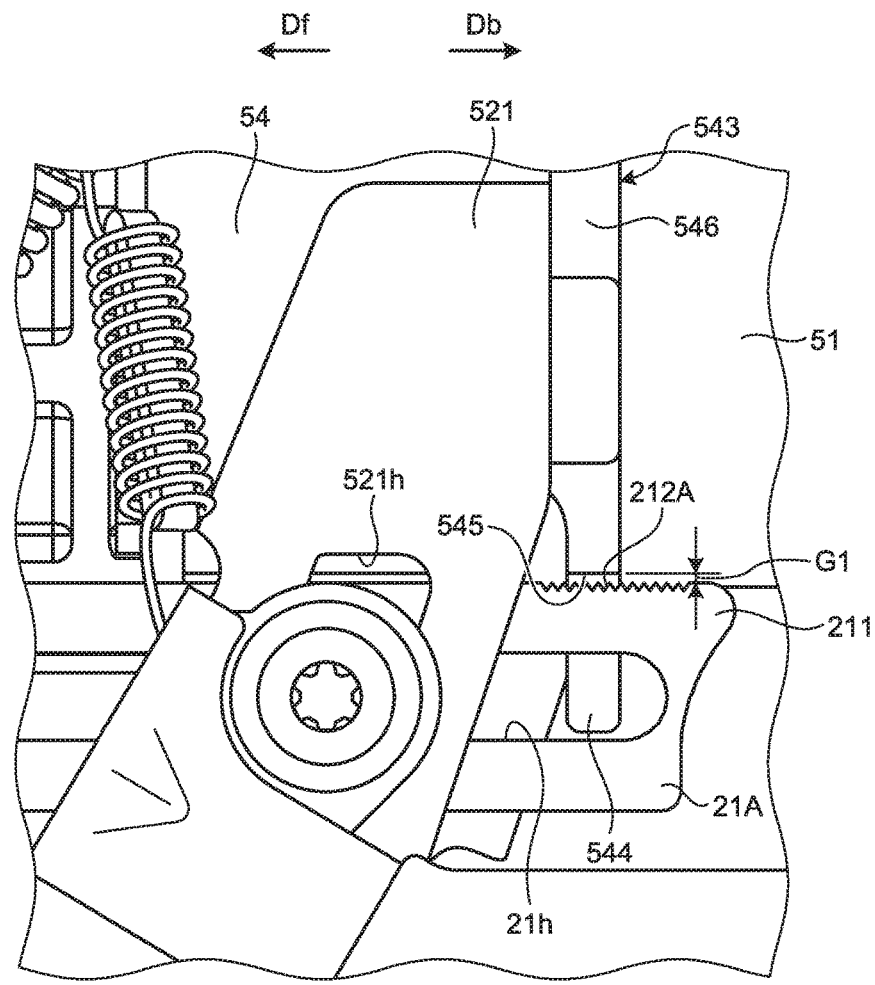
FIG. 27 is an enlarged side view in the periphery of a rotation stopper according to a second modified example.

FIG. 27 is an enlarged side view in the periphery of a rotation stopper according to a second modified example. It is noted that the same reference numeral will be given to the same component as that of the above-described embodiment and a repetitive description thereof will be omitted.

As illustrated in FIG. 27, in a first telescopic friction plate 21A according to the second modified example, an upper end 212A is an uneven surface. More specifically, the upper end 212A is an uneven surface having a saw tooth shape. Accordingly, the upper end 212A is caught by the rotation regulation portion 545 when the first telescopic friction plate 21A rotates. Further, when the outer column 54 is formed of aluminum alloy and the first telescopic friction plate 21A is formed of steel, the upper end 212A is bitten into the rotation regulation portion 545.

In this way, in the steering device 100 according to the second modified example, the telescopic friction plate (the first telescopic friction plate 21A) includes the upper end 212A which is an uneven surface formed at a position facing the rotation regulation portion 545 of the rotation stopper 543.

Accordingly, the upper end 212A is caught by the rotation regulation portion 545 when the first telescopic friction plate 21A rotates. For this reason, in the second modified example, the upper end 212A hardly slides on the rotation regulation portion 545. Thus, the rotation of the first telescopic friction plate 21A and the inner column bracket 4 is easily regulated.

It is noted that the uneven surface of the upper end 212A may not be essentially formed in a saw tooth shape and may be, for example, an uneven surface formed by roughing a surface. Further, the uneven surface of the upper end 212A may not be essentially formed on purpose. For example, the uneven surface may be formed by burrs generated at the edges when the first telescopic friction plate 21A is manufactured by processing a steel plate.

Third Modified Example

Figure 28:
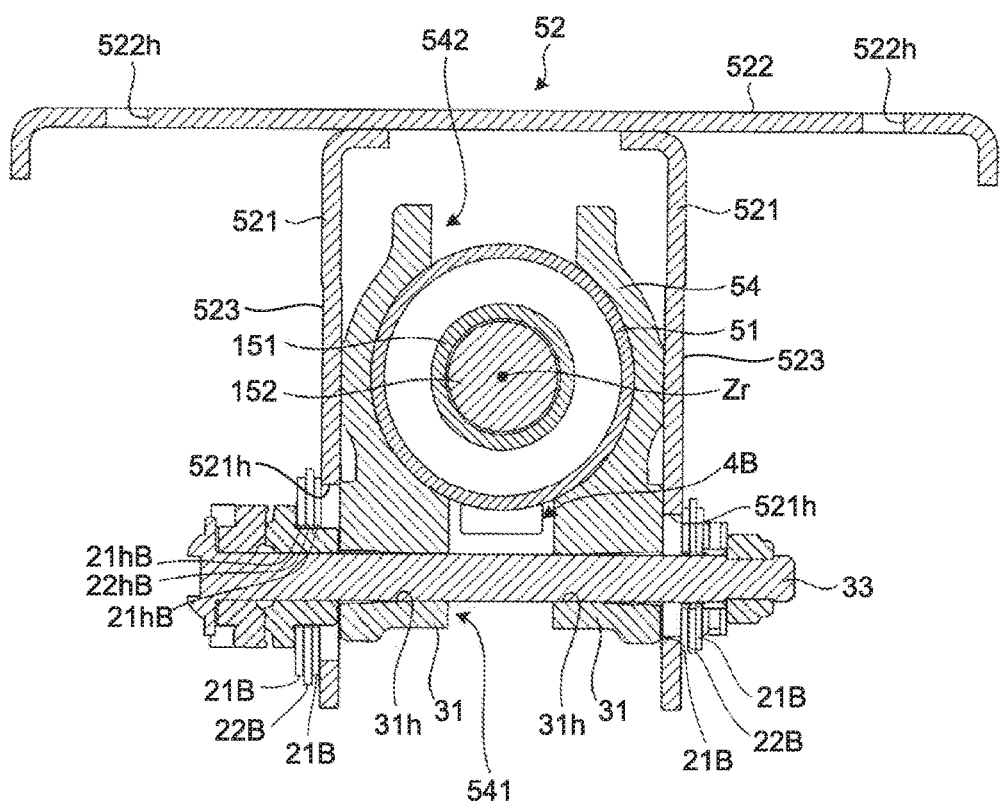
FIG. 28 is a cross-sectional view which corresponds to the cross-sectional view taken along the line A-A in FIG. 2 in a steering device according to a third modified example.
Figure 29:
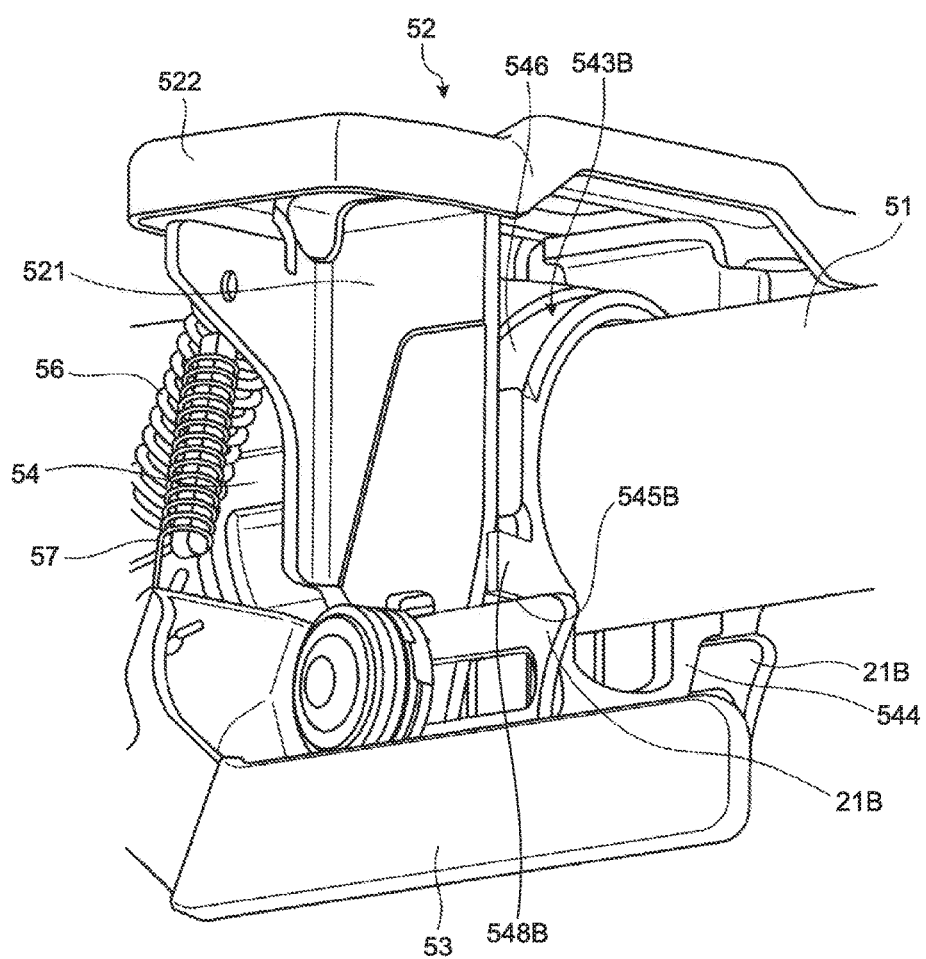
FIG. 29 is a perspective view illustrating the periphery of an outer column bracket according to the third modified example when viewed from the rear side of the vehicle body.
Figure 30:
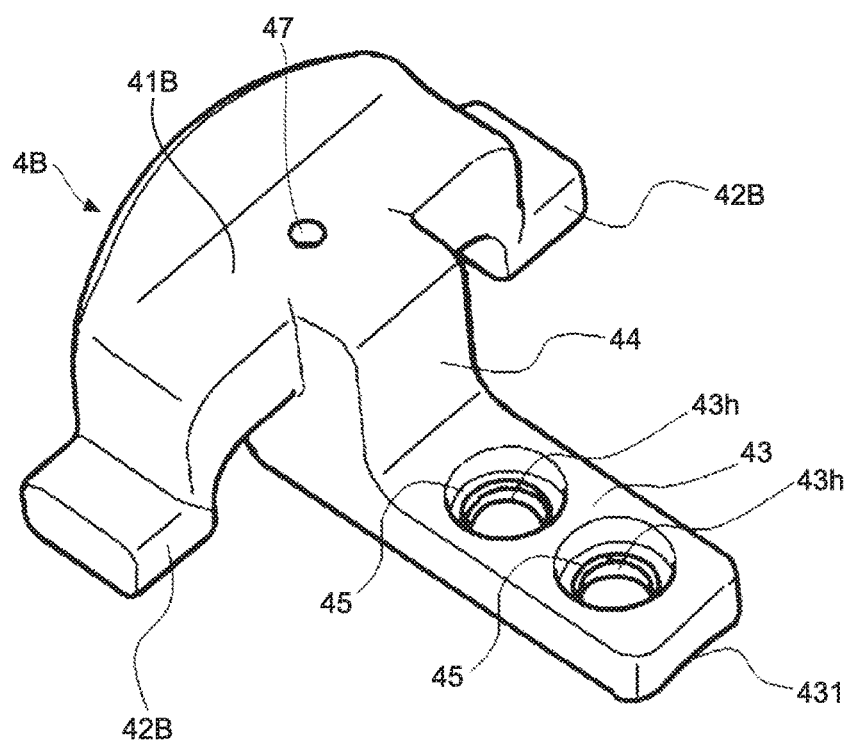
FIG. 30 is a perspective view of an inner column bracket according to the third modified example.
Figure 31:
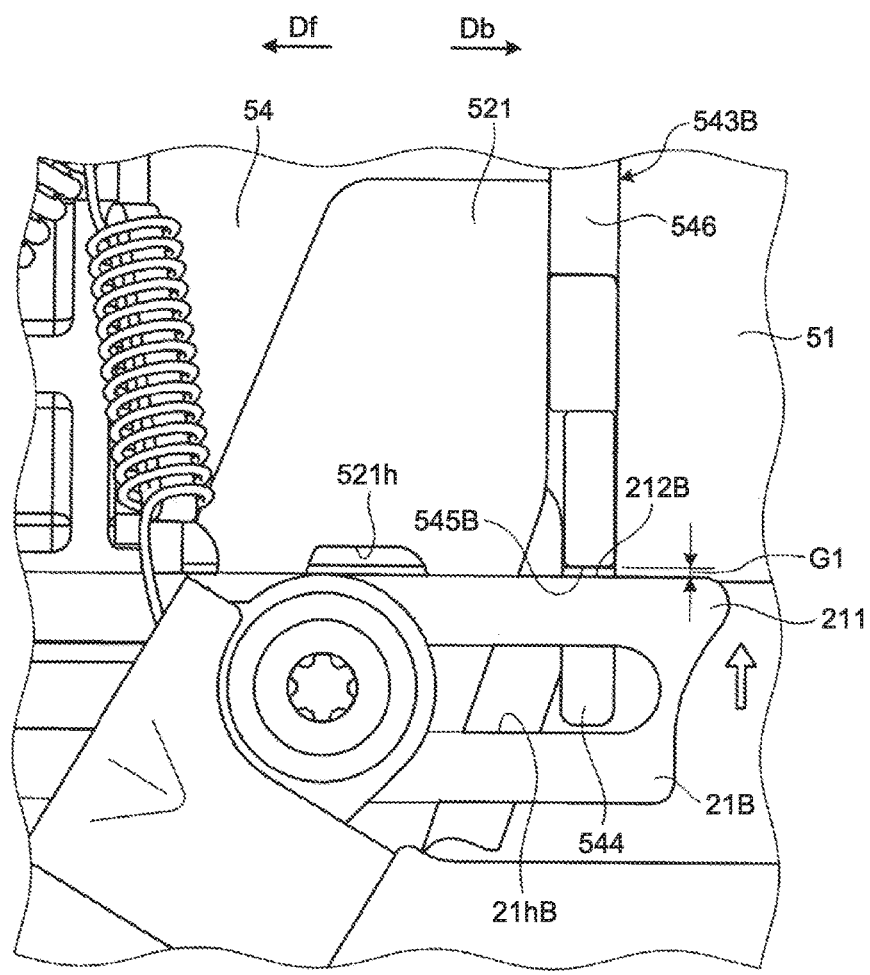
FIG. 31 is an enlarged side view in the periphery of a rotation stopper according to the third modified example.
Figure 32:
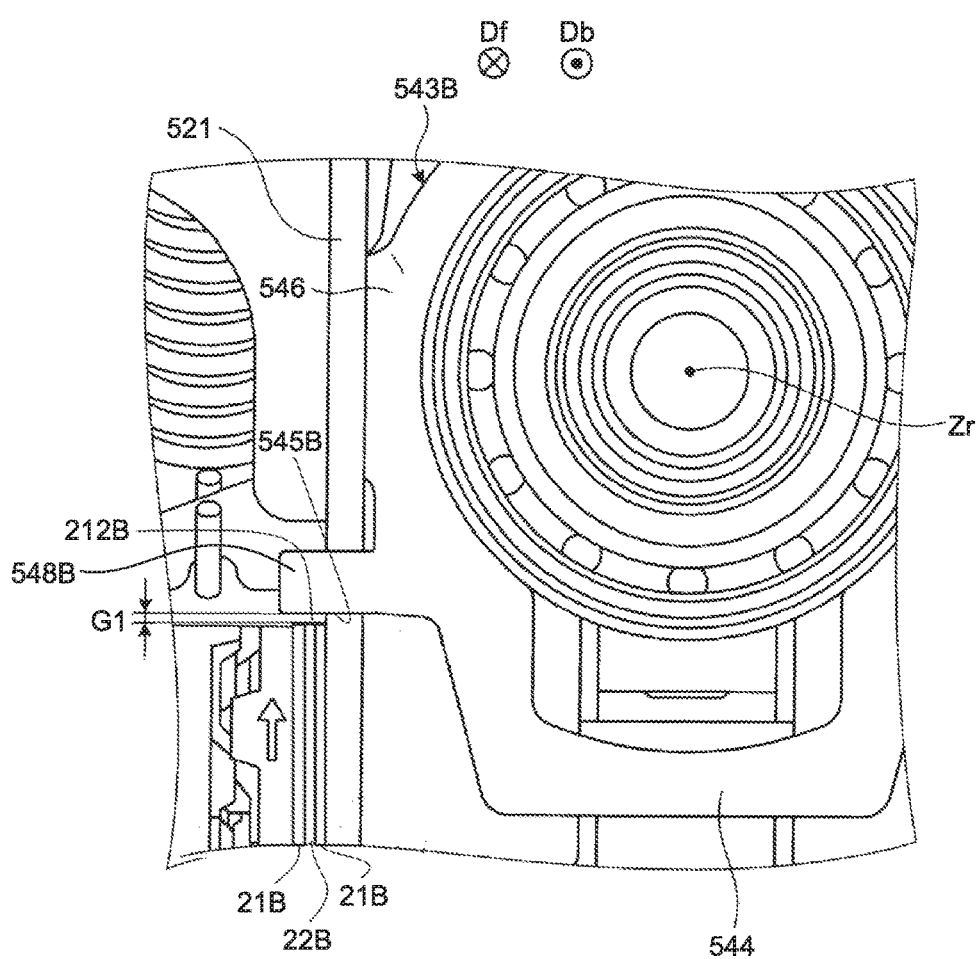
FIG. 32 is an enlarged cross-sectional view in the periphery of the rotation stopper according to the third modified example.

FIG. 28 is a cross-sectional view which corresponds to the cross-sectional view taken along the line A-A in FIG. 2 in a steering device according to a third modified example. FIG. 29 is a perspective view illustrating the periphery of the outer column bracket according to the third modified example when viewed from the rear side of the vehicle body. FIG. 30 is a perspective view of the inner column bracket according to the third modified example. FIG. 31 is an enlarged side view in the periphery of the rotation stopper according to the third modified example. FIG. 32 is an enlarged cross-sectional view in the periphery of the rotation stopper according to the third modified example. It is noted that the same reference numeral will be given to the same component as that of the above-described embodiment and a repetitive description thereof will be omitted.

As illustrated in FIG. 28, the steering device 100 according to the third modified example includes a first telescopic friction plate 21B and a second telescopic friction plate 22B in order to obtain a strong clamping and holding force for the steering column 5. For example, the first telescopic friction plate 21B and the second telescopic friction plate 22B are formed of general steel materials such as cold rolled steel plate (SPCC material). The first telescopic friction plate 21B is a plate-shaped member that includes a telescopic adjustment hole 21hB which is an elongated hole formed so that the direction of the rotation center axis Zr is set as the longitudinal direction. The first telescopic friction plate 21B is disposed two by two in an overlapping manner, for example, at both sides of the outer column 54. More specifically, the first telescopic friction plate 21B is adjacent to an outer surface 523 of the outer column bracket 52. The outer surface 523 of the outer column bracket 52 is a surface which is opposite to a surface facing the outer column 54 of the frame-shaped support portion 521. The second telescopic friction plate 22B is, for example, a member formed of a plate material and includes a rod penetration hole 22hB which is an annular hole formed at the center thereof so that the rod 33 is inserted therethrough. That is, the second telescopic friction plate 22B has a so-called washer shape. The second telescopic friction plate 22B is sandwiched between two first telescopic friction plates 21B.

When the frame-shaped support portion 521 is clamped, the first telescopic friction plate 21B and the second telescopic friction plate 22B are pressed against the frame-shaped support portion 521 and the frame-shaped support portion 521 is pressed against the rod penetration portion 31 of the outer column 54. Accordingly, friction forces are respectively generated between the first telescopic friction plate 21B and the second telescopic friction plate 22B, between the first telescopic friction plate 21B and the frame-shaped support portion 521, and between the frame-shaped support portion 521 and the rod penetration portion 31. For this reason, a surface generating a friction force increases in size compared to a case where the first telescopic friction plate 21B and the second telescopic friction plate 22B are not provided. The frame-shaped support portion 521 can more strongly clamp the outer column 54 by the first telescopic friction plate 21B and the second telescopic friction plate 22B.

As illustrated in FIG. 30, the steering device 100 according to the third modified example includes an inner column bracket 4B which is different from the inner column bracket 4 of the above-described embodiment. The inner column bracket 4B includes, for example, an arm portion 41B and an insertion portion 42B. The arm portion 41B is a bar-shaped portion which connects two pairs of facing first telescopic friction plates 21B at both sides of the outer column 54. The arm portion 41B is provided at a position between the neck portion 44 and the first telescopic friction plate 21B, bending in a direction moving close to the inner column 51. The insertion portion 42B is a portion which is provided at both ends of the arm portion 41B and is inserted into a hole formed at the first telescopic friction plate 21B.

As illustrated in FIGS. 31 and 32, a rotation stopper 543B according to the third modified example includes a protrusion portion 548B. The protrusion portion 548B is a protrusion which protrudes from the side surface of the base portion 546 outward in the radial direction of the outer column 54. The front end of the protrusion portion 548B is positioned at the outside in the radial direction of the outer column 54 in relation to the outer surface 523 of the frame-shaped support portion 521. A rotation regulation portion 545B which is a lower surface of the protrusion portion 548B faces an upper end 212B of the first telescopic friction plate 21B with the gap G1 interposed therebetween.

It is noted that the upper end 212B of the first telescopic friction plate 21B may be the uneven surface illustrated in the second modified example. Accordingly, the upper end 212B is caught by the rotation regulation portion 545B when the first telescopic friction plate 21B rotates.

As described above, in the steering device 100 according to the third modified example, the telescopic friction plate (the first telescopic friction plate 21B and the second telescopic friction plate 22B) is disposed on the outer surface 523 of the outer column bracket 52.

A space at the outside of the outer column bracket 52 is wider than a space at the inside of the outer column bracket 52. For this reason, even when a force of clamping and holding the steering column 5 needs to be stronger, the number of the telescopic friction plates (the first telescopic friction plate 21B and the second telescopic friction plate 22B) can be easily increased.

REFERENCE SIGNS LIST 12, 13 VEHICLE BODY SIDE MEMBER
14 STEERING WHEEL
15 STEERING SHAFT
151 INPUT SHAFT
152 OUTPUT SHAFT
16 UNIVERSAL JOINT
17 LOWER SHAFT
18 UNIVERSAL JOINT
19 PINION SHAFT
100 STEERING DEVICE
21, 21A, 21B FIRST TELESCOPIC FRICTION PLATE
211 REAR END
212, 212A, 212B UPPER END
22, 22B SECOND TELESCOPIC FRICTION PLATE
31 ROD PENETRATION PORTION
33 ROD
4, 4B INNER COLUMN BRACKET
43h SECOND HOLE
46 NOTCH PORTION
47 THROUGH HOLE
49 REAR END
5 STEERING COLUMN
51 INNER COLUMN
51h FIRST HOLE
52 OUTER COLUMN BRACKET
53 OPERATION LEVER
54 OUTER COLUMN
541 FIRST SLIT
541e FIRST INNER END WALL
542 SECOND SLIT
542e SECOND INNER END WALL
543, 543A, 543B ROTATION STOPPER
544 BRIDGE PORTION
545, 545B ROTATION REGULATION PORTION
546 BASE PORTION
547 THIRD SLIT
548, 548B PROTRUSION PORTION
7 STOPPER
8 SHEAR PIN
9 DAMPER
BK SECTION
G1, G2 GAP
L1 TRACK
VB VEHICLE BODY

The invention claimed is:
1. A steering device comprising:
a cylindrical inner column which rotatably supports an input shaft connected to a steering wheel and has a first hole opened therein;
a cylindrical outer column into which at least a part of the inner column is inserted and which has a slit formed by notching one end from which the inner column is inserted;
an outer column bracket which is fixed to a vehicle body side member to support the outer column and clamp the outer column together with a telescopic friction plate which is a plate material;
a rod which penetrates the telescopic friction plate and the outer column bracket and supports the telescopic friction plate;
an inner column bracket which is supported by the telescopic friction plate and has a second hole formed therein;
a shear pin which separably connects the inner column and the inner column bracket at a position across the first hole and the second hole; and
a rotation stopper which is provided at a rear side in relation to the rod and contacts the telescopic friction plate when the telescopic friction plate rotates about the rod in the event of a secondary collision.

2. The steering device according to claim 1,
wherein the rotation stopper is disposed to be separated from the telescopic friction plate with a gap interposed therebetween before the secondary collision occurs.
3. The steering device according to claim 1,
wherein the telescopic friction plate is disposed at both sides of the outer column, and
wherein the rotation stopper contacts each of the telescopic friction plates provided at both sides of the outer column when the telescopic friction plate rotates about the rod.
4. The steering device according to claim 1,
wherein the telescopic friction plate includes an uneven surface formed at a position facing the rotation stopper.
5. The steering device according to claim 1,
wherein the rotation stopper is integrated with the outer column.
6. The steering device according to claim 5,
wherein the telescopic friction plate is disposed between the outer column bracket and the outer column, and
wherein the rotation stopper includes a protrusion portion which overlaps the outer column bracket when viewed from an axial direction of the outer column.
7. The steering device according to claim 1,
wherein the telescopic friction plate is disposed on an outer surface of the outer column bracket.
8. The steering device according to claim 1,
wherein the rotation stopper is an annular member that is positioned at the rear side of the slit and surrounds an entire periphery of the inner column.

* * * * *